United States Patent
Kawaguchi et al.

(10) Patent No.: US 8,649,973 B2
(45) Date of Patent: Feb. 11, 2014

(54) GUIDE DISPLAY DEVICE AND GUIDE DISPLAY METHOD, AND DISPLAY DEVICE AND METHOD FOR SWITCHING DISPLAY CONTENTS

(75) Inventors: Yoshiyuki Kawaguchi, Hachiouji (JP); Mayuha Sakai, Hachiouji (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 489 days.

(21) Appl. No.: 12/996,291

(22) PCT Filed: Jun. 9, 2009

(86) PCT No.: PCT/JP2009/060487
§ 371 (c)(1),
(2), (4) Date: Dec. 3, 2010

(87) PCT Pub. No.: WO2009/151037
PCT Pub. Date: Dec. 17, 2009

(65) Prior Publication Data
US 2011/0106432 A1    May 5, 2011

(30) Foreign Application Priority Data
Jun. 9, 2008 (JP) ................... 2008-150481
Jun. 9, 2008 (JP) ................... 2008-150512

(51) Int. Cl.
*G06F 19/00* (2011.01)
(52) U.S. Cl.
USPC ........... 701/430; 701/409; 701/431; 701/439; 701/454; 701/461; 701/487; 701/491; 345/205
(58) Field of Classification Search
USPC ......... 701/400, 409, 420, 421, 451, 468, 408, 701/410; 345/204, 409, 205; 455/557, 430, 455/431, 439, 444, 454, 461, 487, 491
See application file for complete search history.

(56) References Cited

U.S. PATENT DOCUMENTS 5,819,227 A    10/1998  Obuchi
8,180,567 B2*   5/2012  Geelen et al. ................. 701/431
(Continued)

FOREIGN PATENT DOCUMENTS

JP    09-062991    3/1997
JP    09-329457    12/1997
(Continued)

OTHER PUBLICATIONS

International Search Report for Application Serial No. PCT/JP2009/060487 dated Sep. 15, 2009.

(Continued)

*Primary Examiner* — Ronnie Mancho
(74) *Attorney, Agent, or Firm* — Eric J. Robinson; Robinson Intellectual Property Law Office, P.C.

(57) ABSTRACT

The present invention provides the simple operation for displaying the information that is expected to be necessary for the user and the simplified procedure of the hands-free operation when displaying the map information on the screen. The display device 20 in which an arrangement state of the screen can be selected between a first state and a second state displays on the screen the detailed information of a destination or its surrounding area such as parking lot information, an access route guide to the transportation facilities, and information of the facility of the destination is displayed on the screen if a change of the arrangement of the screen is detected, if the destination has been set in advance, and if a distance between a current position and the destination is within a predetermined distance. Further, it comprises a display control means 27 for displaying at least a portion of the information acquired by the information acquisition means 23 if the change in the arrangement state of the screen is detected after the external equipment detection means 25 detected the connection of the external equipment 4.

15 Claims, 25 Drawing Sheets

(56) References Cited

U.S. PATENT DOCUMENTS

| | | | |
|---|---|---|---|
| 2003/0018427 A1* | 1/2003 | Yokota et al. | 701/208 |
| 2004/0243307 A1* | 12/2004 | Geelen | 701/213 |
| 2007/0032949 A1* | 2/2007 | Arai et al. | 701/211 |

FOREIGN PATENT DOCUMENTS

| | | |
|---|---|---|
| JP | 10-160489 | 6/1998 |
| JP | 11-108676 | 4/1999 |
| JP | 2000-298033 | 10/2000 |
| JP | 2004-309297 | 11/2004 |
| JP | 2005-049139 | 2/2005 |

OTHER PUBLICATIONS

Notification of Transmittal of Translation of the International Preliminary Report on Patentability (Application No. PCT/JP2009/060487) dated Jan. 11, 2011.

* cited by examiner

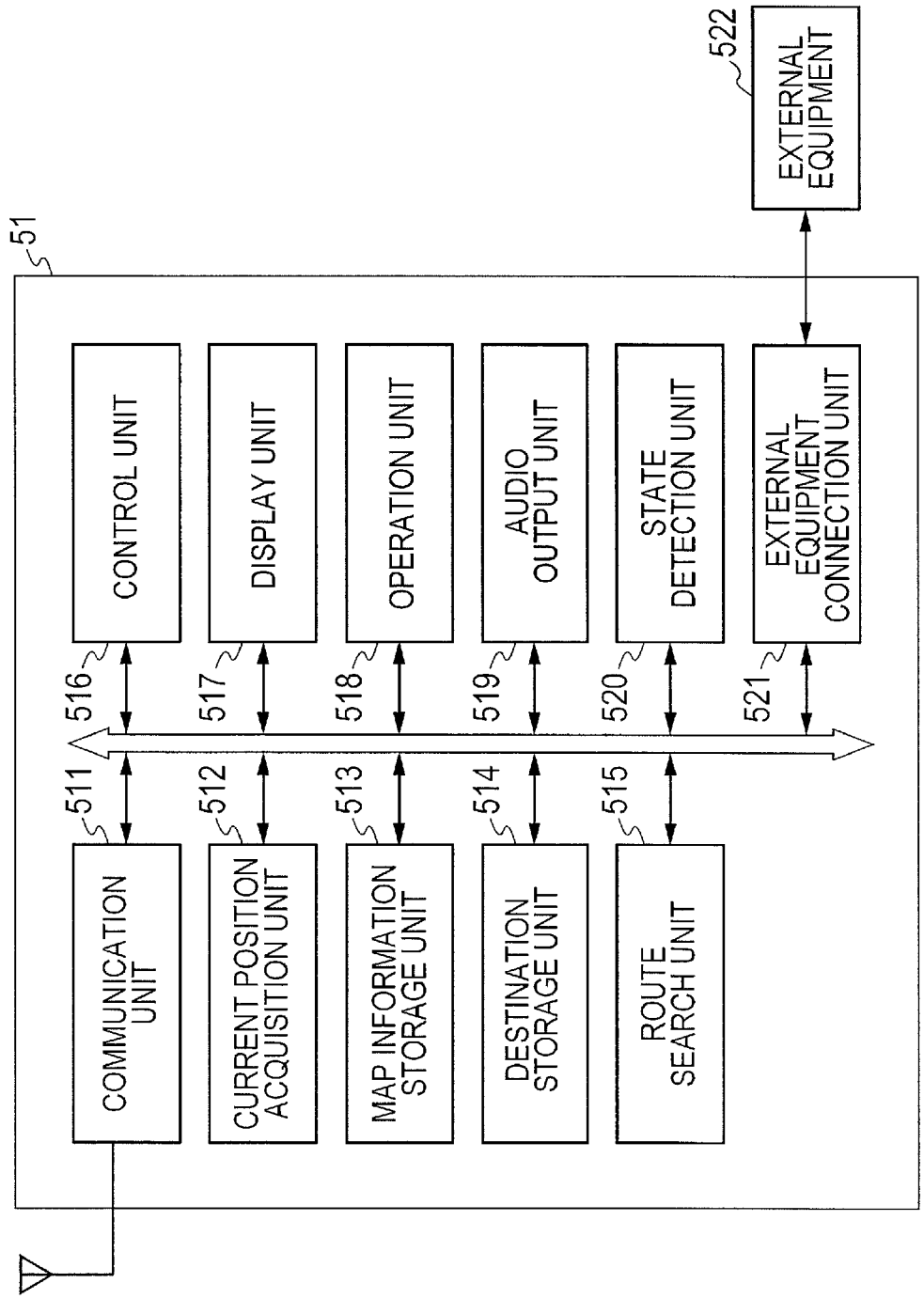

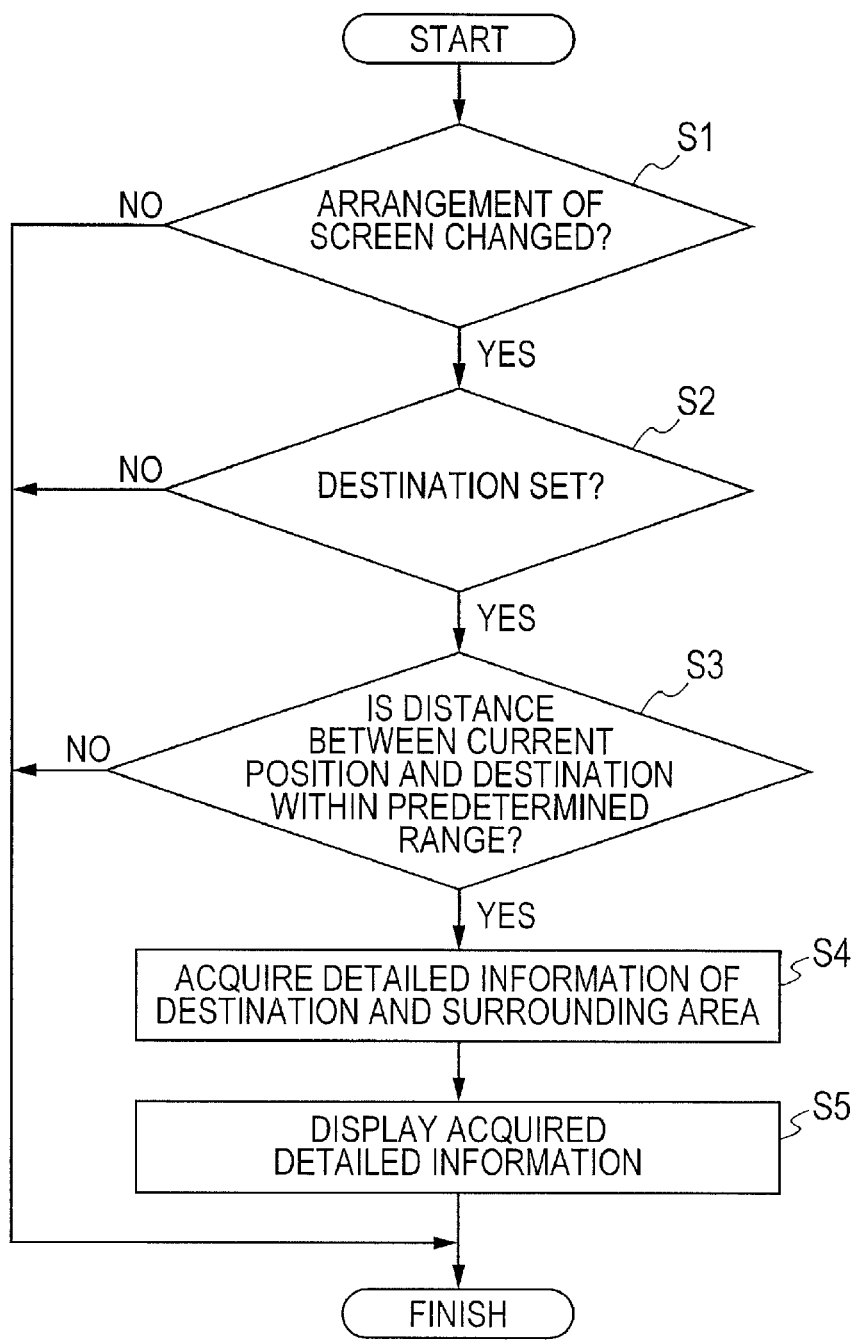

FIG. 4A
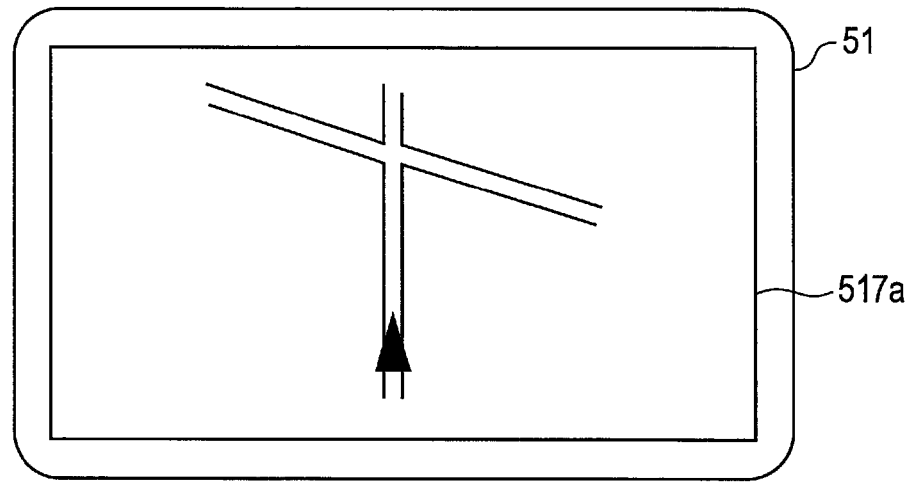
FIG. 4B
| | Distance |
|---|---|
| Parking lot A | 20m |
| Parking lot B | 100m |
| Parking lot C | 170m |
| Parking lot D | 175m |
| Parking lot E | 180m |
| Parking lot F | 200m |
| Parking lot G | 220m |

FIG. 5

```
              Distance
Parking lot C    170m
Initial          ¥500/1hr
Extension        ¥100/15min
Vacancy          5
   Department store A
   2hr-free for
   ¥3000 purchase Parking lot D    175m
Initial          ¥500/1hr
Extension        ¥100/15min
Vacancy          8
```
— 517a

FIG. 6

| | Vacancy | Initial fee | Extension | Distance |
|---|---|---|---|---|
| Parking lot A | 10 | ¥500/1hr | ¥300/30min | 20m |
| Parking lot B | 12 | ¥200/30min | ¥100/15min | 100m |
| Parking lot C | 5 | ¥500/1hr | ¥100/15min | 170m |

— 517a

FIG. 13A
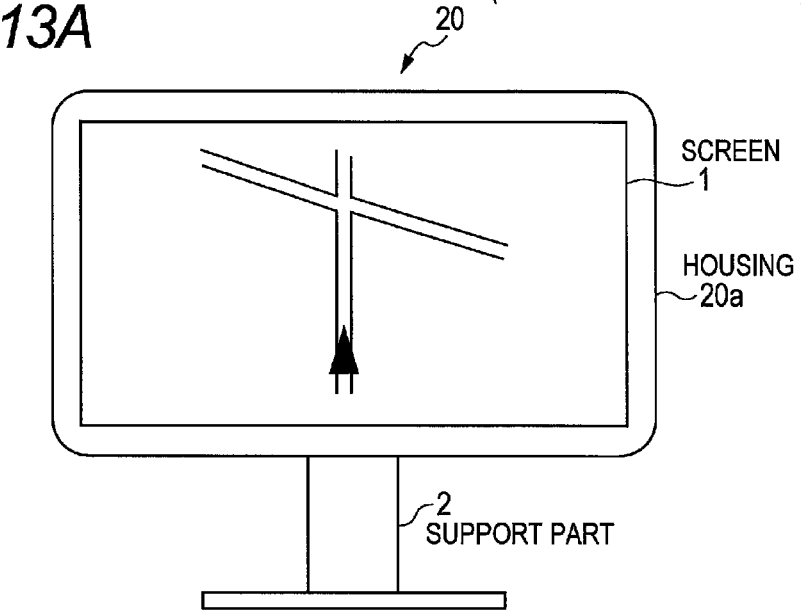
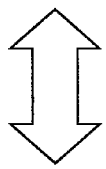
FIG. 13B
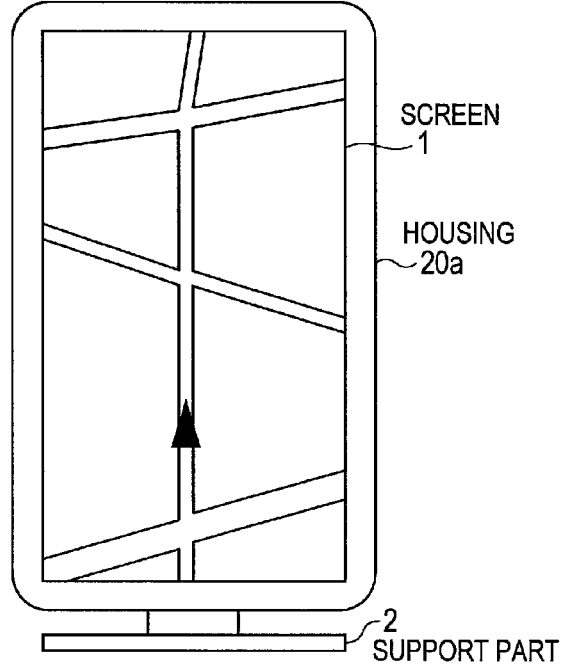

GUIDE DISPLAY DEVICE AND GUIDE DISPLAY METHOD, AND DISPLAY DEVICE AND METHOD FOR SWITCHING DISPLAY CONTENTS

TECHNICAL FIELD

The present invention relates to a guide display device and a guide display method, and a display device and a method for switching display contents.

BACKGROUND ART

Car navigation systems and PNDs (Personal/Potable Navigation Device) have been widely used as guide display devices for displaying a user's current position on a map and guiding a route to its destination. In these devices, the current position is detected by the GPS (Global Positioning System), the map of the area around the current position is extracted from map information stored in a storage device or acquired through a communication line, and the map and the current position on the map are displayed. Then, the destination and, if necessary, the way point are registered so that the route to the destination can be searched to provide the route navigation to the user. Typically, the map can be displayed not only in two-dimensional map but also in bird's eye view in which the landmark can be viewed.

The car navigation system may use a hard disc or a DVD having a large capacity as the storage device for storing the map information and provide the detailed information and various functions to the user. On the other hand, the PND use a flash memory having a relatively small capacity as the storage device, so that, while the amount of the stored information and the functions are limited, it is advantageous for its inexpensiveness and easy use. Therefore, the PND is used for other purposes than the vehicle-mounted use. Further, devices in which the limited map information only is stored in the storage device and the detailed map information is acquired through the communication line are well known.

Further, with respect to the car navigation system and the PND, there disclosed a device in which, when the screen is switched between a horizontal arrangement and a vertical arrangement, a horizontally arranged map and a vertically arranged map are switched alternatively according to the arrangement of the screen (for example, Patent document 1), and a device in which, among the information of the shop, facility, and the like located in the destination, the information which matches the user taste is displayed (for example, Patent document 2).

Patent Document 1: JP Patent Application Publication No. H8-166245

Patent Document 2: JP Patent Application Publication No. 2006-58193

It is prohibited by the Road Traffic Act to directly touch a portable telephone device to talk on the phone when driving a vehicle. But, it is not prohibited to talk on the phone without touching the portable telephone device by using the hands-free function. Patent document 3 discloses a hands-free device for achieving such a hands-free function.

This hands-free device is used with the portable telephone device connected thereto. When the portable telephone device is connected to the hands-free device, the information stored in the portable telephone device is transferred to the hands-free device. Further, buttons of the hands-free device correspond to buttons of the portable telephone device. This allows the operation with larger buttons on the hands-free device instead of the smaller buttons on the portable telephone device. Therefore, the driver can make a calling operation of the portable telephone device safely and correctly even when driving the vehicle.

FIG. 29 is a flowchart showing an operation flow when the hands-free device is used. As shown in FIG. 29, first, a hands-free button is pressed down (step S40). A telephone directory or a calling/called operation history is then read out (step S41). A destination is then selected (step S42). Finally, a send button is pressed down (step S43). Thereby, the originating process is made (step S44).

Further, Patent document 4 discloses a device in which the destinations are sequentially indicated by voice. This eliminates the need for the driver to look at the list of the destinations. Therefore, safer drive can be achieved.

Patent document 3: JP Patent Application Publication No. 2004-134977

Patent document 4: JP Patent Application Publication No. H10-190810

DISCLOSURE OF THE INVENTION

Problems to be Solved by the Invention

The above-described hands-free device is useful for reducing the burden at the driver. However, the driver is still required to perform the multiple procedures as shown in FIG. 29. Therefore, it will be useful that apart of these procedures can be omitted.

The first objective of the present invention is to provide a guide display device and a guide display method that can display, with a simple operation, the information that is expected to be necessary for the user.

Further, the present invention is invented under such a background, and therefore the second purpose is to provide a display device and a method for switching the display contents that can simplify the procedures of the hands-free operation.

Hereafter, for the purpose of explanation, the inventions that achieve the first purpose and the second purpose are referred to as an invention I and an invention II, respectively.

Means for Solving the Problems

Invention I

In order to achieve the first objective, a guide display device comprises a current position acquisition means for acquiring a current position; a destination storage means for storing a destination; a display means for displaying an image; a display control means for controlling a display content; and an arrangement change detection means for detecting that an arrangement of a screen of the display means has been changed, wherein the display control means causes the display means to display detailed information of the destination or its surrounding area if the arrangement of the screen is changed under a state where a distance between the current position and the destination is less than a predetermined distance. It is preferable that the display means displays map information.

The display control means may cause the display means to display information of a facility of the destination or its peripheral facility as the detailed information. If the destination is a facility of transportation facilities or if there is a facility of transportation facilities around the destination, the display control means preferably causes the display means to display information of an access route to the facility as the detailed information.

The guide display device may further comprises a means for determining what transportation is used. In this case, if the transportation is a vehicle, the display control means may cause the display means to display information of a parking lot and, otherwise, to display information of a facility of the destination or its peripheral facility.

As the detailed information of the destination or its surrounding area, information stored in the storage means together with the map information and/or information downloaded by using a communication means may be used.

Regarding a guide display method of the present invention, the guide display method for displaying guide information on a screen comprises the step of displaying detailed information of a destination or its surrounding area on the screen if a change in an arrangement of the screen is detected, if the destination has been set in advance, and if a distance between a current position and the destination is less than a predetermined distance.

Invention II

In order to achieve the second objective, a display device in which an arrangement state of the screen can be selected between a first state and a second state that comprises an external equipment detection means for detecting a connection of external equipment; an information acquisition means for acquiring information from the external equipment if the external equipment detection means detects the connection of the external equipment; a screen state detection means for detecting whether the arrangement state of the screen is in the first state or the second state; and a display control means for displaying at least a portion of the information acquired by the information acquisition means if the change in the arrangement state of the screen is detected by the screen state detection means after the external equipment detection means detected the connection of the external equipment.

Here, the external equipment is a portable telephone device, and the display control means displays predetermined image information on the screen if a calling operation of the portable telephone device has not been made and the change in the arrangement state of the screen is again detected by the screen state detection means after the at least a portion of the information acquired by the information acquisition means was displayed on the screen. For example, the predetermined image information is image information of a keyboard.

Further, the display control means may prohibit the display of the information acquired by the information acquisition means if there is no predetermined operation input even if the change in the arrangement state of the screen is detected by the screen state detection means after the external equipment detection means detected the connection of the external equipment.

Further, another aspect of the present invention is a method for switching a display content. The method for switching a display content of the present invention is a method for switching a display content for use in a display device in which an arrangement state of the screen can be selected between a first state and a second state. The method comprises the steps of detecting a connection of external equipment; acquiring information from the external equipment if the connection of the external equipment is detected; detecting whether the arrangement state of the screen is in the first state or the second state; and displaying at least a portion of the information acquired by the step of acquiring, if the change in the arrangement state of the screen is detected after the connection of the external equipment was detected.

Here, the display of the information acquired by the step of acquiring may be prohibited if there is no predetermined operation input even if the change in the arrangement state of the screen is detected after the connection of the external equipment was detected.

Another aspect of the present invention is a program. That is, a program of the present invention, when installed in an information processing device, instructs the information processing device to perform a function as a display device in which an arrangement state of a screen can be selected between a first state and a second state. The program is configured to implement an external equipment detection function for detecting a connection of external equipment; an information acquisition function for acquiring information from the external equipment if the external equipment detection function detects the connection of the external equipment; a screen state detection function for detecting whether the arrangement state of the screen is in the first state or the second state; and a display control function for displaying at least a portion of the information acquired by the information acquisition function if the change in the arrangement state of the screen is detected by the screen state detection function after the external equipment detection function detected the connection of the external equipment.

Advantage of the Invention

According to the invention I, the information that is expected to be necessary for the user can be displayed by a simple operation of changing the arrangement of the screen.

According to the invention II, the procedure of the hands-free operation can be simplified.

BRIEF DESCRIPTION OF THE DRAWINGS

FIG. 2 is a block diagram showing a circuit arrangement of the guide display device of FIG. 1 according to the invention I.

FIG. 3 is a flowchart showing an example of an operation of the guide display device of FIG. 1 according to the invention I.

FIG. 4 illustrates (A) a change in arrangement and (B) an associated display switching of the screen of the guide display device of FIG. 1 according to the invention I.

FIG. 5 shows an example display when a parking lot C is selected in the lower window of FIG. 4.

FIG. 6 shows an example view in the guide display device of FIG. 1 according to the invention I in which an item selected from the display of FIG. 5 is displayed with a horizontal arrangement.

FIG. 13 shows a display device according to the invention II in which (A) is a view where the display is in a horizontal arrangement and (B) is a view where the display is in a vertical arrangement.

EXPLANATION OF THE REFERENCES

51: guide display device; 52: attachment; 53: rotation switch; 54, 55: contact; 56: contact on the main unit; 511: communication unit; 512: current position acquisition unit (current position acquisition means); 513: map information storage unit; 514: destination storage unit (destination storage means); 515: route search unit; 516: control unit (display control means); 517: display unit (display means); 517a: screen; 518: operation unit; 519: audio output unit; 520: state detection unit (arrangement change detection means); 521: external equipment connection unit; 522: external equipment; 523: transportation storage unit (means for determining what transportation is used); 1: screen; 2: support part; 3: connector; 4: portable telephone device; 5: scroll bar; 6: send button; 7: keyboard; 8: wireless transceiver; 9: portable music device; 10: portable telephone device connection check window; 11: hands-free setting button; 12: play button; 20: display device; 20a: housing; 21: control unit; 22: external equipment detection unit (external equipment detection means); 23: information acquisition unit (information acquisition means); 24: storage unit; 25: external equipment connection unit; 26: display state detection unit (display state detection means); 27: display control unit (display control means); 28: route search unit; 30: audio output unit; 40: rotation switch; 41, 42, 43: contact

DESCRIPTION OF THE PREFERRED EMBODIMENTS

Invention I
[First Embodiment]

Figure 1:
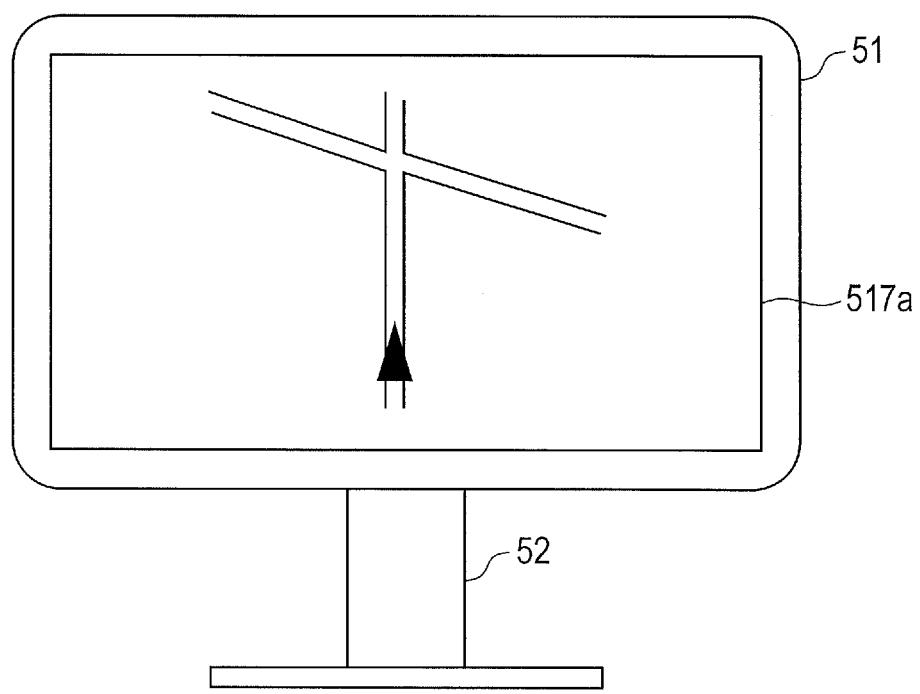
FIG. 1 shows a first embodiment of the invention I, which illustrates a usage of a guide display device.

FIGS. 1 and 2 show the first embodiment of the invention I. FIG. 1 shows a usage of a guide display device, and FIG. 2 shows a circuit block diagram thereof. The explanation will be provided assuming that the guide display device is a PND.

In this embodiment, while a guide display device 51 can be used separately such as by being carried by the user, an attachment 52 may be used if the guide display device 51 is fixed somewhere (for example, a dashboard in the vehicle) to be used. The attachment 52 has a structure which allows easy attachment and detachment without needing a tool, or it can be attached to the dashboard or a window of the vehicle by a sucker(s). While a stand-like part is shown as the attachment 52 in FIG. 1, an arm-like part and other part of different shapes may be used.

By referring to FIG. 2, the arrangement of the guide display device 51 will be explained. This guide display device 51 comprises a communication unit 511; a current position acquisition unit 512; a map information storage unit 513; a destination storage unit 514; a route search unit 515; a control unit 516; a display unit 517; an operation unit 518; an audio output unit 519; a state detection unit 520; and an external equipment connection unit 521. External equipment 522 can be connected to the external equipment connection unit 521.

The communication unit 511 receives the GPS signal and/or the VICS (Vehicle Information Communication System) information, and the like. The current position acquisition unit 512 functions as a current position acquisition means, which detects a current position based on the GPS signal received by the communication unit 511. The map information is stored beforehand in the map information storage unit 513. The destination storage unit 514 functions as a destination storage means for storing a destination, in which the destination set by the input from the operation unit 518 and, if necessary, away point are stored. The route search unit 515 searches a route from the current position to the destination. The control unit 516 controls the operation of each unit of the guide display device 51, and also functions as a display control means for controlling display contents in the screen 517a. The display unit 517 functions as a display means for performing an image display, which displays the map information, the current position, and other various information on the screen 517a according to the control by the control unit 516. This screen 517a functions as a touch panel, where the user can touch an intended item among the displayed items to select the touched one. Further, the map information displayed on the screen 517a may include various information accompanying that map window though it may include the map window only. The operation unit 518 comprises various switches and/or buttons, or the touch panel of the screen 517a, which receives the user input operation and transfers it to the control unit 516. The state detection unit 520 functions as an arrangement change detection means, which detects the arrangement state of the screen 517a of the display unit 517. The external equipment 522 such as Bluetooth (trademark) equipment and audio equipment can be connected to the external equipment connection unit 521.

[Fundamental Operation]

The fundamental operation of the guide display device 51 will be explained. Typically, the control unit 516 searches the map information storage unit 513 based on the current position acquired from the current position acquisition unit 512, and causes the current position and its peripheral map to be displayed on the screen 517a of the display unit 517. The user can set the scale of the map and set which of the north or the traveling direction comes the top of the map by the operation from the operation unit 518 Further, when the map information supports the three-dimension display, i.e., the bird's eye view, the user can set either two-dimensional display or three-dimensional display. While the current position changes for every moment according to the movement, the control unit 516 updates the displayed map according to the change.

Once the user has set the destination and, if necessary, the way point by the operation from the operation unit 518, these are stored in the destination storage unit 514, and the route search unit 515 searches the route from the current position to the destination via the way point based on the map information stored in the map information storage unit 513. Then, the control unit 516 performs the route guide (navigation). In this route guide, the route to the destination is displayed on the map in the screen 517a with making the route to the destination stand out. When there is an approaching intersection, the distance to the intersection and the direction (lane) to be taken are displayed by a larger indication. Also, the landmark near the intersection is displayed in an easy-to-see manner. Further, the audio output unit 519 outputs a message such as "turn to the right at the next intersection". When the destination approaches, the audio output unit 519 outputs a message such as "you are approaching your destination". When the destination is reached, the audio output unit 519 outputs a message such as "you have arrived at your destination".

[Operation when the Arrangement of the Screen is Changed]

FIG. 3 is a flowchart illustrating an example operation in the guide display device 51 shown in FIGS. 1 and 2 when the arrangement of the screen 517a is changed. If the arrangement of the screen is detected by the state detection unit 520 (step S1, Yes), if the destination has been set in advance (step S2, Yes), and if the distance between the current position and the destination is less than a predetermined distance (step S3, Yes), the control unit 516 acquires the detailed information of the destination or its surrounding area (step S4) and causes the acquired detailed information to be displayed on the screen 517a (step S5). For example, regarding the range to the destination, the distance from the current position to the destination will be less than 5 km if the scale of the window being displayed is 1/50,000, so will be less than 2.5 km if the scale of the window is 1/25,000. In a memory in the control unit 516, a larger range map than is being displayed is developed, and thus the distance to the destination can be calculated in the control unit 516 even in the state where the destination is not displayed on the screen. Further, the acquired detailed information may be the information stored in the map information storage unit 513 together with the map information, or may be the information downloaded via the Bluetooth (trademark) equipment as the external equipment 522 connected to the external equipment connection unit 521. Further, both pieces of the above information may be used.

If the arrangement of the screen 517a has not been changed (step S1, No), if the destination has not been set (step S2, No), or if the distance between the current position and the destination is greater than the predetermined distance (step S3, No), the flow ends and returns to the fundamental operation mentioned above.

[Switching of the Screen]

FIG. 4 illustrates an example of the change in arrangement and its associated display switching of the screen 517a when the distance between the current position and the destination is less than the predetermined distance. Here, the explanation will be provided assuming that the guide display device 51 is attached to the vehicle. As shown in FIG. 4(A), it is assumed that the route guide is being performed while the screen 517a is displaying the current position on the map in a horizontal arrangement. Once the screen 517a has been changed from the current state to a vertical arrangement, the control unit 515 acquires the information of the parking lot(s) around the destination and causes the available parking lot(s) to be listed on the screen 517a. This list may be displayed overlapped on the route guide window after the route guide window has been switched in a suitable manner for the vertical arrangement, or may be displayed without the route guide window.

FIG. 5 shows an example display on the screen 517a when a parking lot C has been selected in FIG. 4(B). Once the user has selected a parking lot from the listed parking lots by the touch operation, the detailed information of the parking lots following the selected parking lot is displayed on the screen 517a.

FIG. 6 shows an example in which the detailed information of the selected parking lot is displayed on the screen 517a in the horizontal arrangement. In the display state of FIG. 6, the user selects some parking lots to place a checkmark and, then, when the arrangement of the screen 517a is changed again, the detailed information of the checked parking lots is listed on the screen 517a. This allows an easy-to-see display for the user. This screen may be overlapped on the route guide window, or may be without the route guide window. The screen of FIG. 6 may be displayed if the screen 517a was rotated by 90 degrees clockwise to be the screen such as FIG. 4(B) and then the screen 517a is rotated by 90 degrees anti-clockwise. However, the display of FIG. 6 may return to the normal route guide window with no list display if the screen 517a is rotated by 90 degrees anti-clockwise, and may be displayed if the screen 517a is further rotated by 90 degrees clockwise.

Assuming that some parking lots can be selected by the touch operation in the display state of FIG. 4(B), the detailed information regarding the selected parking lots may be listed as shown in FIG. 6 when the arrangement of the screen 517a is changed again under the state where the some parking lots have been selected. Further, an item may be selected by the touch operation in the display state of FIG. 5, and the selected item is displayed in the display state of FIG. 6.

Figure 7:
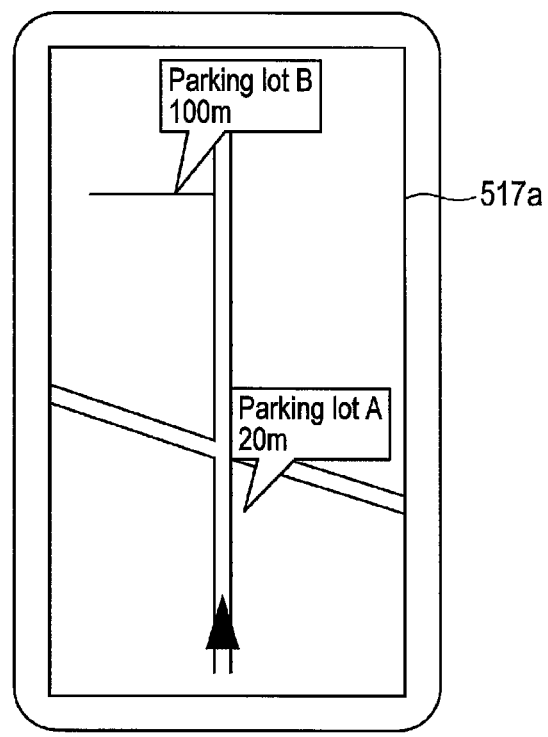
FIG. 7 shows an example view in the guide display device of FIG. 1 according to the invention I for displaying detailed information of a destination or its surrounding area in a balloon form when the arrangement of the screen has been changed.
Figure 8:
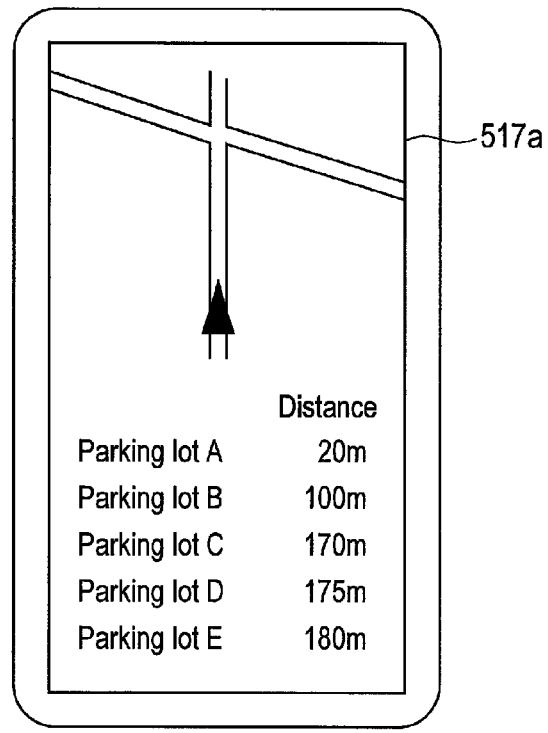
FIG. 8 shows an example view in the guide display device of FIG. 1 according to the invention I for displaying detailed information of a destination or its surrounding area by dividing the screen into an upper and a lower windows where the route guide display is in the upper and the list display is in the lower when the arrangement of the screen is changed.

FIGS. 7 and 8 respectively show other examples of the detailed information of the destination or its surrounding area when the arrangement of the screen 517a has been changed. In the example of FIG. 7, the detailed information is displayed in a balloon form. In the example of FIG. 8, the screen 517a is divided into the upper and the lower in which the route guide display is in the upper and the list display is in the lower. The arrangement, upper/lower, of the route guide display and the list display may be opposite to that shown in FIG. 8.

[Second Embodiment]

Figure 9:
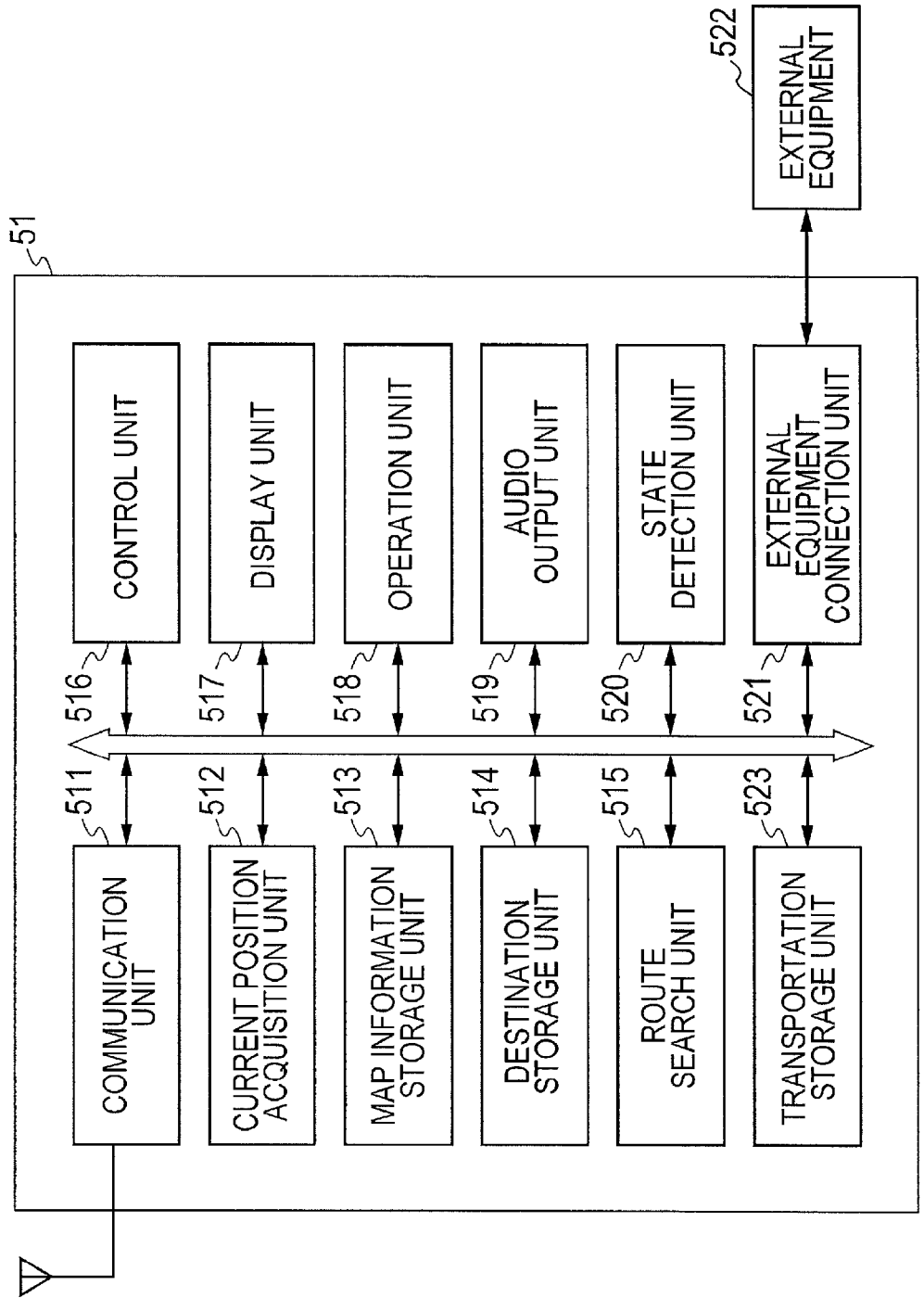
FIG. 9 is a block diagram showing a second embodiment of the invention I, which illustrates another example of a circuit arrangement of the guide display device of FIG. 1.

FIG. 9 is a block diagram showing a second embodiment of the present invention, which illustrates another example of the circuit arrangement of the guide display device of FIG. 1. In this embodiment, similarly to the embodiment described by referring to FIGS. 1 and 2, the explanation will be provided assuming that the guide display device is the PND. This second embodiment is different from the arrangement of FIG. 2 in that it comprises a transportation storage unit 523 as a means for determining what transportation is used. The transportation inputted from the operation unit 518 is stored in the transportation storage unit 523. It is preferable that the transportation is inputted at the same time the user sets the destination and, if necessary, the way point. The arrangements other than the transportation storage unit 523 will be the same as those shown in FIG. 2, and the explanation thereof will be thus omitted.

[Operation when the Arrangement of the Screen is Changed]

Figure 10:
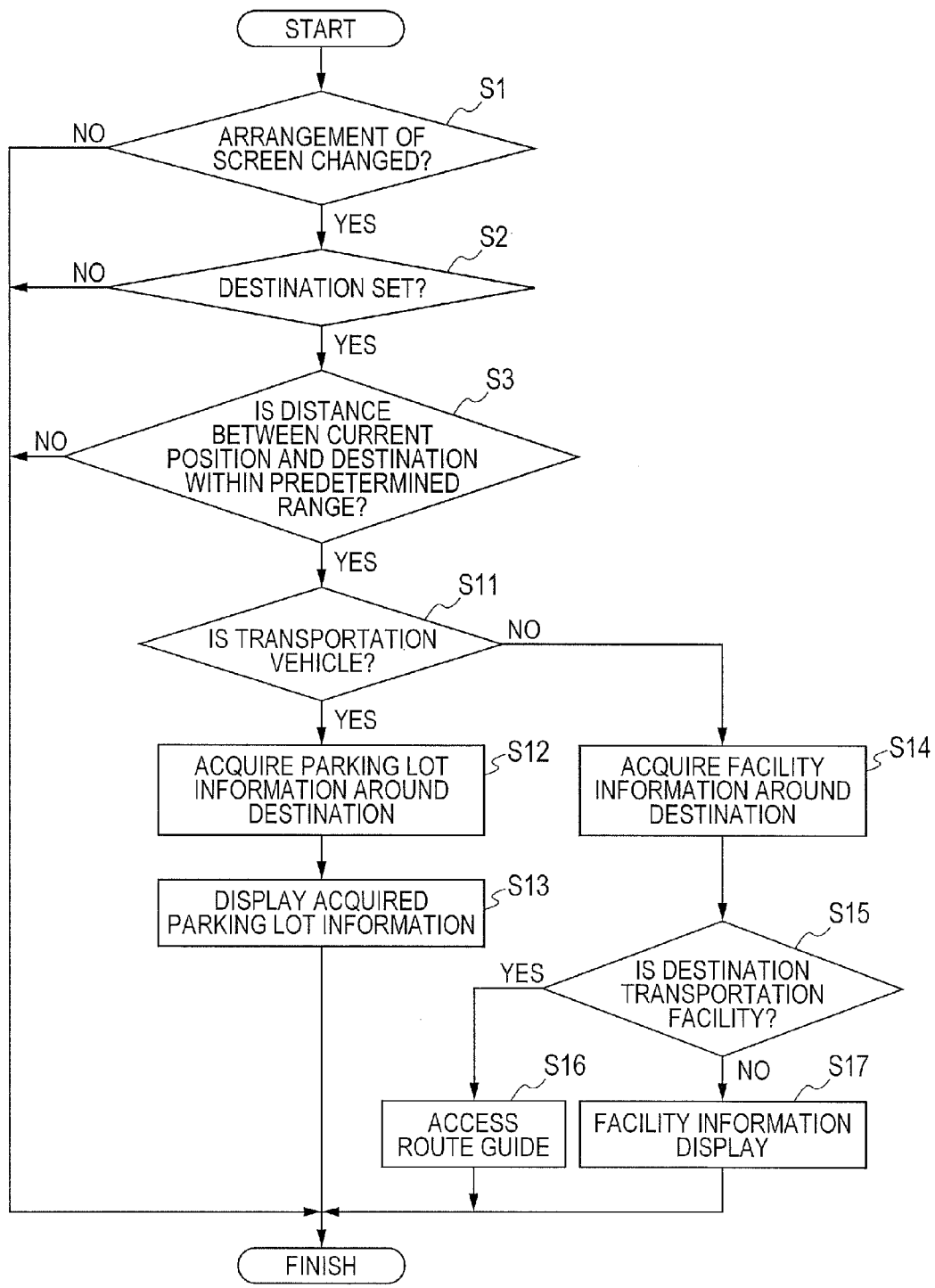
FIG. 10 is a flowchart showing an example operation of the guide display device of FIG. 9 according to the invention I, which illustrates an example for displaying information related to parking lots if a transportation is a vehicle and, otherwise, displaying information related to a facility of a destination and facilities nearby.

FIG. 10 is a flowchart in the guide display device 51 of FIG. 9, which illustrates an example of the operation when the screen is changed. If the arrangement of the screen is detected by the state detection unit 520 (step S1, Yes), if the destination has been set in advance (step S2, Yes), and if the distance between the current position and the destination is less than a predetermined distance (step S3, Yes), the control unit 516 first determines whether the transportation stored in the transportation storage unit 523 is a vehicle or other (step S11). If the transportation is a vehicle (step S11, Yes), the parking lot information around the destination is acquired (step S12) and the information is displayed on the screen (step S13) as described by referring to FIGS. 4 to 8. If the registered transportation is not a vehicle (step S11, No), it is determined that the transportation is on foot (including the case using a public transportation such as bus, train, and the like on the way), and the information regarding facilities around the destination is acquired (step S14). Then, if the destination is a facility of the transportation facilities such as a station, a bus terminal, and the like, or if there is a facility of the transportation facilities around the destination (step S15, Yes), the information regarding an access route to the facility is displayed on the screen and the guide is provided (step S16). If the destination is other facility, for example, a public facility, a picturesque scenery, a sightseeing area, an amusement facility, and the like (step S15, No), the information of the facility is acquired and displayed (step S17).

[Detection of the Change in Arrangement of the Screen]

Figure 11:
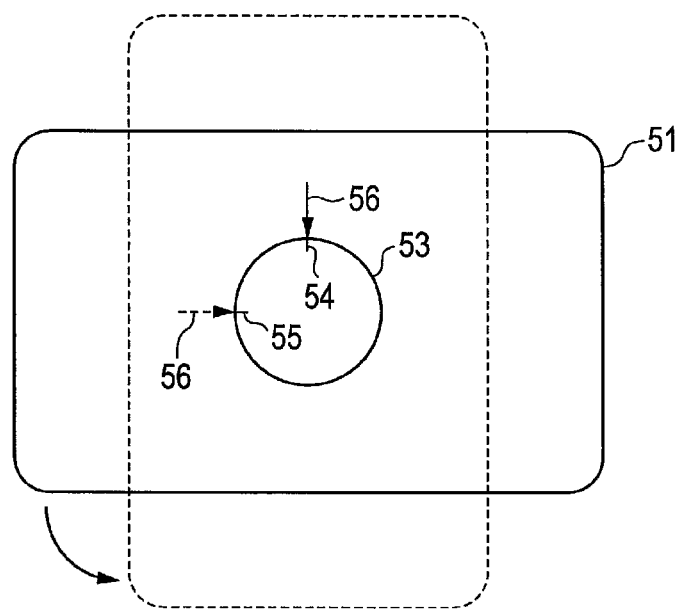
FIG. 11 shows an example of a process for detecting the change in arrangement of the screen of the guide display device of FIG. 1 according to the invention I.

FIG. 11 shows an example of a method for detecting the change in the arrangement of the screen 517a, which shows the state where the guide display device 51 is viewed from the backside thereof. In this example, the attachment part for attaching the guide display device 51 to the attachment 52 is used as a rotation switch 53. This rotation switch 53 comprises two contacts 54 and 55. It can be determined that the screen 517a is in the horizontal arrangement (solid line) if a contact 56 of the main unit of the guide display device 51 is connected to the contact 54, while it is determined to be in the vertical arrangement (broken line) if the contact 56 is connected to the contact 55. Alternatively, it may be configured to use either one of the contacts 54 and 55. In the case where the contact 54 only is used, it can be determined to be in the horizontal arrangement if the contact 56 of the main unit is connected thereto, otherwise, it can be determined not to be in the horizontal arrangement. While the determination of "not in the horizontal arrangement" means that it is in either slantwise arrangement or vertical arrangement, it is determined to be in the vertical arrangement in this case. In the case where the contact 55 only is used, unless the contact 56 of the main unit is connected to the contact 55, it is determined that there is no change in the arrangement. The number of the contacts of the rotation switch 53 may be increased to detect not only the rotation positions of 0 degrees and 90 degrees but also the rotation positions of −90 degrees (270 degrees) and/or 180 degrees.

Figure 12:
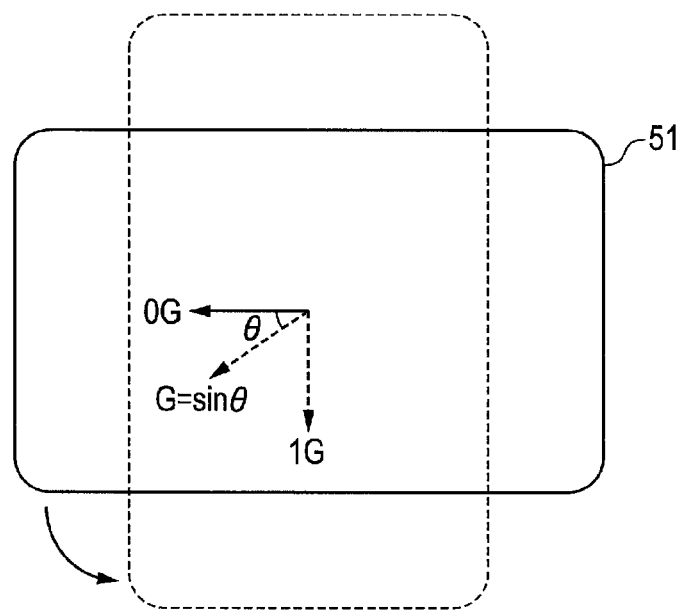
FIG. 12 shows another example of a process for detecting the change in arrangement of the screen of the guide display device of FIG. 1 according to the invention I.

FIG. 12 shows another example of the method for detecting the state of the screen, which illustrates an example in which the G-sensor (acceleration sensor) provided inside the guide display device 51. The guide display device 51 in FIG. 12 is also viewed from the backside thereof in order to have the positional relation correspond to FIG. 11. The G-sensor outputs 1 G when it is in the perpendicular direction, while it outputs 0 G when it is in the horizontal direction because no gravity is applied. Here, the G-sensor is set to be in the horizontal direction when the screen 517a of the guide display device 51 is in the horizontal arrangement, while the G-sensor is set to be in the perpendicular direction when the screen 517a is in the vertical arrangement. There is a relation of G=sin θ between the gravity acceleration G and the inclination θ of the G-sensor with respect to the horizontal direction. The use of the G-sensor allows not only to determine the horizontal arrangement and the vertical arrangement but also to derive the angle of the guide display device 51.

In the rotation switch 53 shown in FIG. 11, in the case where the guide display device 51 is attached to the attachment 52, the screen 517a can be switched only by pushing the side portion of the guide display device 51 and then rotating it with respect to the attachment 52. But, when using the guide display device 51 by picking it by hand, the user needs to directly operate the rotation switch 53. However, in the case where the G-sensor is used, the screen 517a can be switched to the state corresponding to the vertical arrangement or the state corresponding to the horizontal arrangement by merely inclining the guide display device 51, though it is necessary to keep the surface of the screen 517a in substantially perpendicular.

Although FIGS. 11 and 12 show that the right side of the front comes to the bottom when the guide display device 51 is inclined, the same switching of the screen is possible when the left side comes to the bottom or when either right side or left side comes to the bottom.

As described above, according to the embodiments of the present invention, the contents in the screen can be switched only by changing the arrangement of the screen 517a of the guide display device 51. Although it will be difficult to implement the rotation of the screen in the built-in car navigation system, it can be implemented to the devices such as the car navigation system and the PND which can be attached to various positions. In such devices, by reaching for the screen to rotate or merely incline it, the user can easily switch the contents in the screen with hardly needing to look away from the front. In particular, the user may rotate the whole main unit if the screen and the main unit are the integrated such as the PDN.

While the embodiments of the present invention has been described above, the present invention can be modified as long as the concept thereof is not changed. For example, in not only the case where the display means is integrated into the main unit of the guide display device 51 but also the case where the display means is separated from the main unit of the guide display device, the present invention can be implemented by detecting the inclination of the display means.

Further, if the shape of the screen 517a is a square even if the frame shape of the guide display device 51 is a horizontal rectangular, the device may be adapted to provide the normal guide display when the navigation device 51 is horizontally arranged and provide the list display when vertically arranged. Alternatively, the device may be adapted to provide the normal guide display when the screen 517a is horizontally arranged and provide the list display when vertically arranged.

Further, it is possible to change the displayed contents according to the rotation direction of the guide display device 51 or its screen 517a. For example, it is possible to list the parking lot information if a clockwise 90-degree rotation is made, and to display the access guide to the station if an anti-clockwise 90-degree rotation is made. Moreover, it is possible to further display other types of list display if a 180-degree rotation is made, and/or not to display the list display if a left or right 90-degree rotation is made, and to display the list display if a 180-degree rotation is made. It is possible to display a map suitable to the arrangement such that the detailed information is displayed if a rotation is made to one direction while the destination can be viewed over or the scale is changed to indicate the positions of the current position and the destination if a rotation is made to the other direction, as disclosed in Patent document 1.

Further, a hard disc, a DVD, a ROM (read-only-memory), a flash memory, and the like may be used as the map information storage unit 513. For the display unit 516 as a display means, a mere liquid crystal display device or other flat display device may be used other than the touch panel system. While the current position detection unit 512 as an arrangement detection means, the state detection unit 519 as a state detection means, and the route search unit 514 may be configured as single hardware, respectively, they may also be implemented as software by sharing the CPU (central processing unit), the ROM, the RAM (random access memory), and the like configuring the control unit 515 that can also function as a display control means.

Although the above descriptions have been provided assuming that the map information has been stored beforehand in the map information storage unit 513, the map information and/or the route search result may be acquired from the server by using the communication line such as the internet line provided by the communication unit 511 or the external equipment 521 connected to the external equipment connection unit 521. The map information and/or the route search result acquired by using the communication line can be stored in the map information storage unit 513 and utilized to perform the same operation. Further, the present invention may be implemented by the always-on communication to update the necessary map information. The current position and/or the route search result and the peripheral information can be acquired by using the communication line in the same manner.

Invention II

Figure 14:
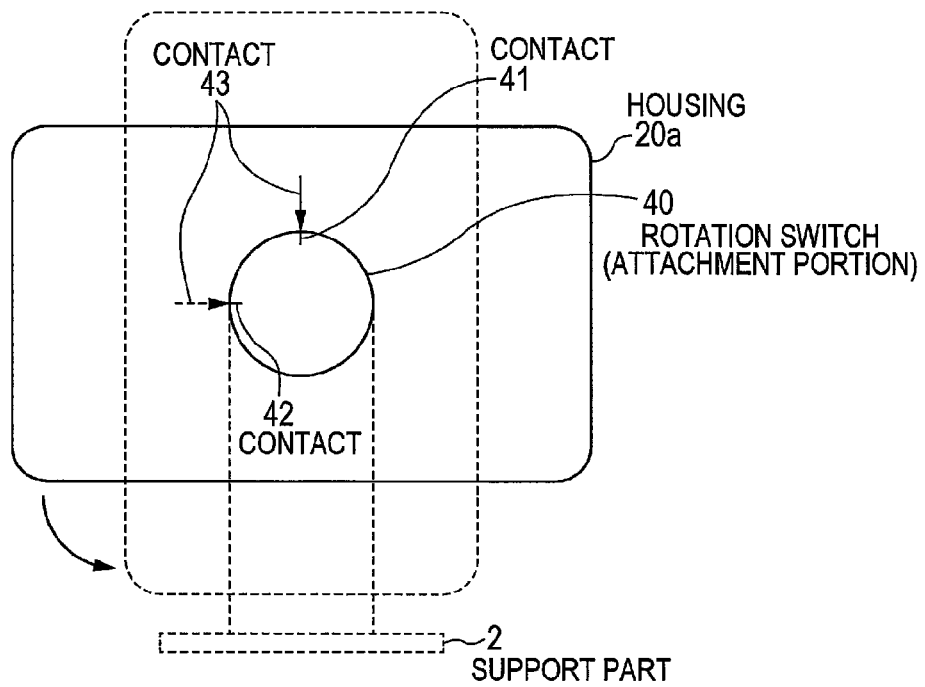
FIG. 14 shows an example of a process for detecting a usage of the screen of the display device of FIG. 13 according to the invention II.
Figure 15:
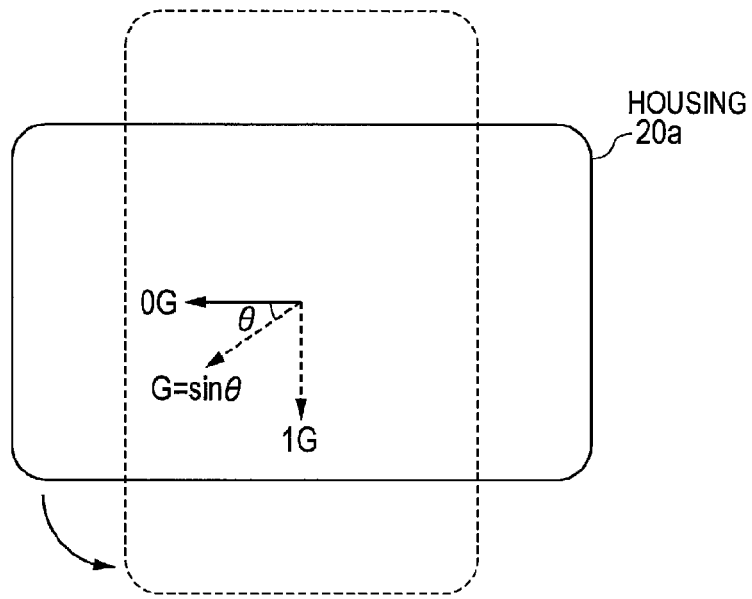
FIG. 15 shows another example of a process for detecting a usage of the screen of the display device of FIG. 13 according to the invention II.
Figure 16:
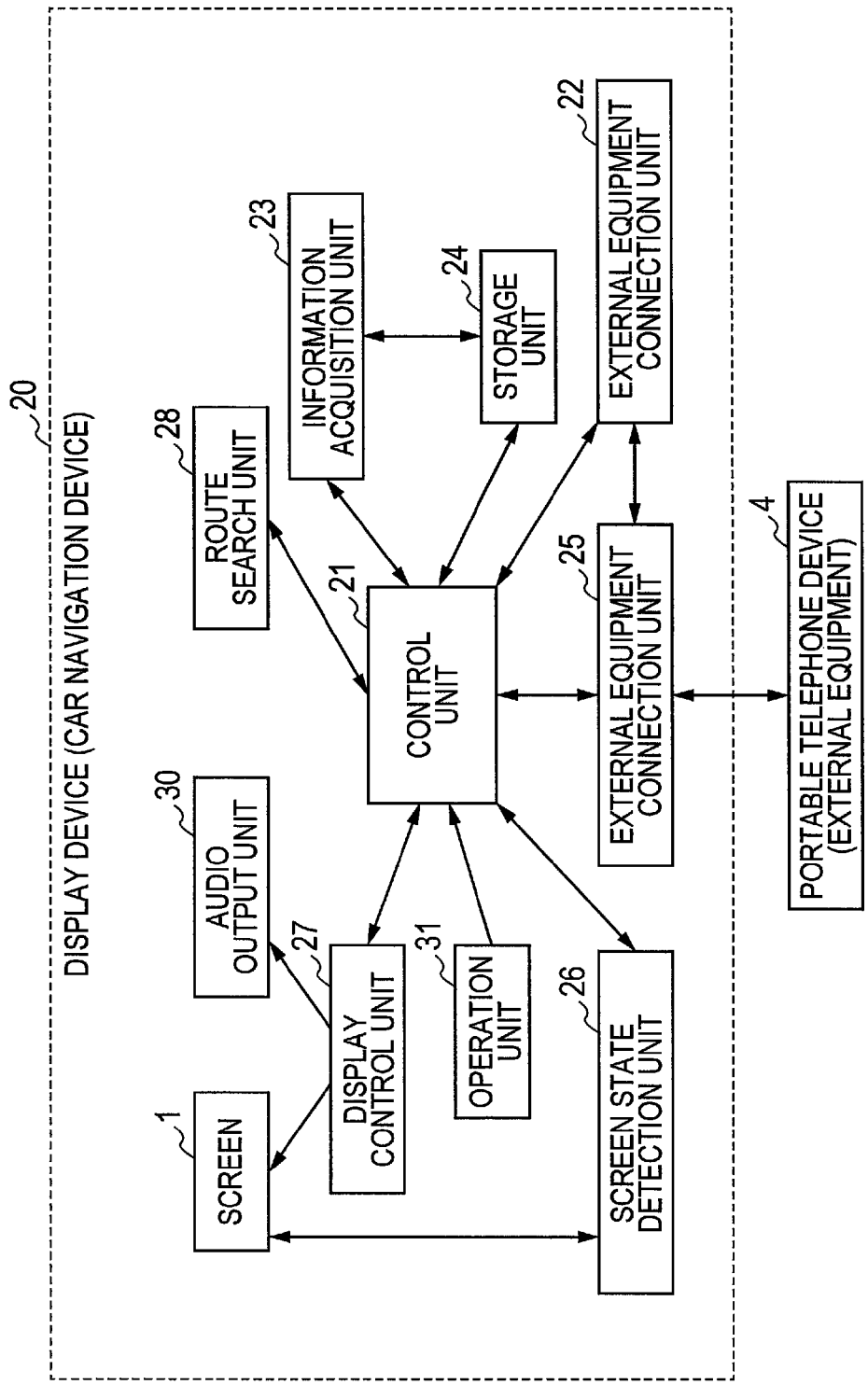
FIG. 16 is a block diagram of the display device of FIG. 13 according to the invention II.

The embodiment of a display device of the invention II will be described by referring to FIGS. 13 to 25. FIG. 13 shows a screen 1 in a display device 20. FIGS. 14 and 15 illustrate an example of a method for detecting the arrangement state of the screen 1. FIG. 16 is a block diagram of the display device 20 of the embodiment in the invention II. The display device 20 of the embodiment in the invention II is used mainly when the vehicle is traveling. Therefore, in the embodiment in the invention II, the display device 20 is a car navigation device. Here, the car navigation device includes a PND (Personal Navigation Device). However, it is not intended to limit the protection scope of the invention II to the car navigation device. For example, it may be a television receiver for the vehicle-mounted use. Alternatively, it maybe a device similar to the hands-free device of Patent document 1.

As shown in FIG. 13, the display device 20 of the embodiment in the invention II has a housing 20a having a rectangular frame and a rectangular screen 1. In the display device 20, selection can be made between the first state of the arrangement of the screen 1 (FIG. 13(A)) where the longer edge of the rectangular is horizontal and the second state of the arrangement of the screen 1 (FIG. 13(B)) where the shorter edge of the rectangular is horizontal.

Further, in the display device 20, the display device is switched according to the arrangement state of the screen 1. Hereafter, the first state is referred to as a horizontal arrangement and the second state is referred to as a vertical arrangement. As an example use for the car navigation device, the display range can be changed if the horizontal arrangement is changed to the vertical arrangement. For example, the road in the front which is not displayed in FIG. 13(A) is displayed in FIG. 13(B). The vertical/horizontal of the image is changed according to the vertical/horizontal of the screen 1.

FIG. 14 shows a state where the housing 20a is viewed from the backside thereof. In this example, an attachment part for attaching the housing 20a to a support part 2 is used as a rotation switch 40. This rotation switch 40 comprises two contacts 41 and 42. It can be determined that the screen 1 is in the horizontal arrangement (solid line: FIG. 13(A)) if a contact 43 of the main unit is connected to the contact 41. On the other hand, it is determined that the screen 1 is in the vertical arrangement (broken line: FIG. 13(B)) if the contact 43 is connected to the contact 42.

Alternatively, either one of the contact 41 and the contact 42 may be used. In the case where the contact 41 only is used, if the contact 43 of the main unit is connected thereto, it can be determined to be in the horizontal arrangement, otherwise, it can be determined not to be in the horizontal arrangement. The determination of "not in the horizontal arrangement" means that it is in either slantwise arrangement or vertical arrangement. In this case, however, it is determined to be in the vertical arrangement and the display is vertically arranged. When the contact 42 only is used, unless the contact 43 of the main unit is connected to the contact 42, the display of the vertical arrangement is continued.

FIG. 15 shows another example of the method for detecting the arrangement state of the screen 1. FIG. 15 shows an example using a G sensor (acceleration sensor). In FIG. 15, the housing 20a is also viewed from the backside thereof in order to have the positional relation correspond to FIG. 14. The G-sensor outputs 1G when it is in the perpendicular direction, while outputs 0G when it is in the horizontal direction because no gravity is applied. Here, if the state of the screen 1 is in the horizontal arrangement, it is defined that the G-sensor is in the horizontal direction. On the other hand, if the arrangement state of the screen 1 is in the vertical arrangement, it is defined that the G-sensor is in the perpendicular direction. There is a relation of G=sin θ between the gravity acceleration G and the inclination θ of the G-sensor. The method using the G-sensor does not require the support part 2. For example, the display device 20 can be used by leaning it against something.

In FIGS. 14 and 15, although it has been described that, when the screen 1 is inclined, the right side in the front thereof comes to the bottom. But, the same switching of the screen may be possible when the left side comes to the bottom or when either right side or left side comes to the bottom.

As shown in FIG. 16, the display device 20 of the embodiment of the present invention comprises an external equipment detection unit 22 for detecting the connection of a portable telephone device 4. Further, the display device 20 comprises an information acquisition unit 23 for acquiring the information including a telephone directory and a calling/called operation history from the portable telephone device 4 when the external equipment detection unit 22 detects the connection of the portable telephone device 4. In addition, the portable telephone device 4 and the display device 20 are connected via an external equipment connection unit 25. A connector 3 (by referring to FIG. 17) may be connected to the external equipment connection unit 25.

Further, the display device 20 comprises a screen state detection unit 26 for detecting whether the arrangement state of the screen 1 is in the horizontal arrangement (FIG. 13(A)) or the vertical arrangement (FIG. 13(B)). Furthermore, the display device 20 comprises a display control unit 27 for displaying on the screen 1 a part of the information acquired by the information acquisition unit 23 when the window state detection unit 26 detects the change in the arrangement state of the screen 1 after the external equipment detection unit 22 detected the connection of the portable telephone device 4.

The screen 1 and an audio output unit 30 are connected to the display control unit 27. For example, the operation unit 31 is a touch panel integrated with the screen 1. Further, since the display device 20 is the car navigation device, it comprises a route search unit 28. The control unit 21 controls each unit. Further, it comprises a storage unit 24 for storing map data. The storage unit 24 may be a semiconductor memory or a storage device using a DVD (Digital Video Disk) or a CD (Compact Disk). Further, in the case of so called communication navigation, the map data may be stored in a server (not-shown), and the display device 20 may then read the map data from the server if necessary. In this case, a map data acquisition unit or a communication unit for communicating with the server may be provided in place of the storage unit 24.

(First Embodiment of a Switching Operation of Display Contents)

Figure 17A:
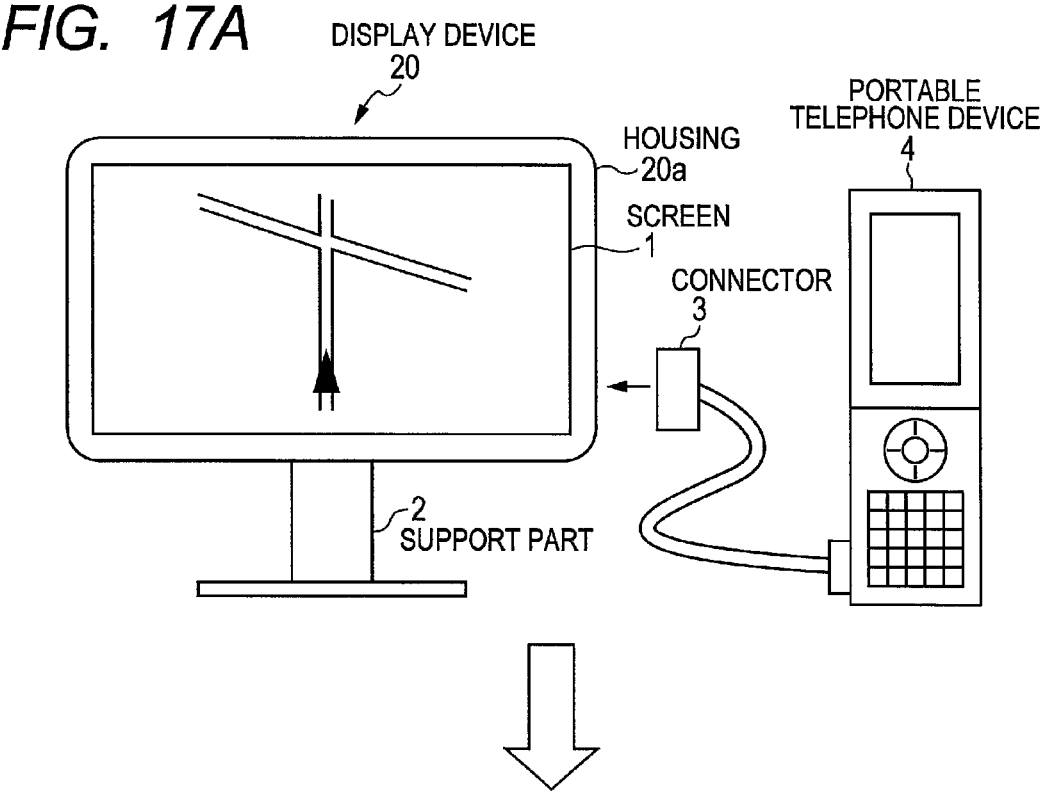
FIG. 17 illustrates a connection between the display device of FIG. 13 according to the invention II and a portable telephone device, in which (A) shows a state before an establishment of the connection and (B) shows a state after the establishment of the connection.
Figure 17B:
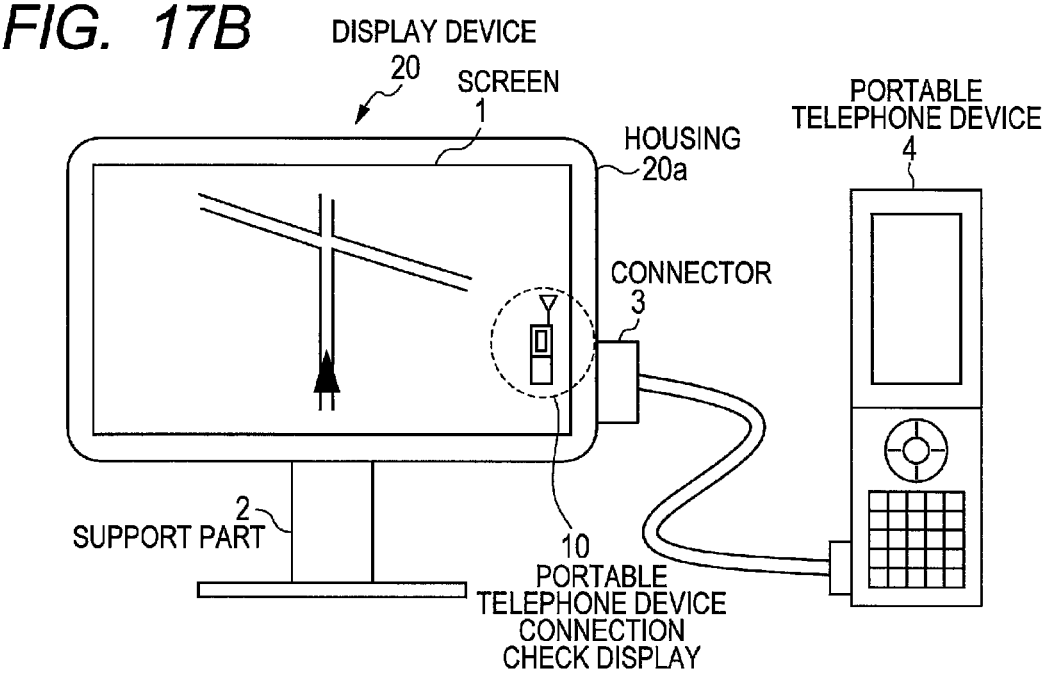

Next, a switching operation in the vertical-horizontal switching of the screen 1 will be explained by referring to FIGS. 17-19. FIG. 17 illustrates the connection of the portable telephone device 4 to the display device 20. As shown in FIG. 17(A), the connector 3 is used to connect the portable telephone device 4 and the display device 20. In addition, the connector 3 may be provided to the external equipment connection unit 25. The external equipment detection unit 22 checks the connection between the portable telephone device 4 and the display device 20. Thereby, a portable telephone device connection check display 10 appears on the screen 1.

Figure 18A:
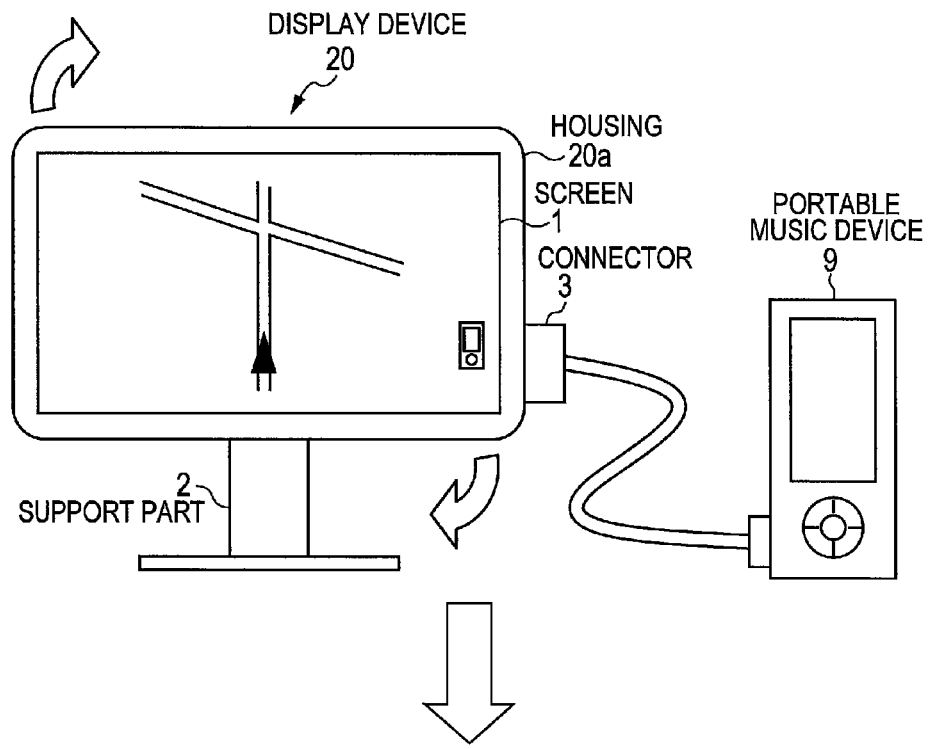
FIG. 18 illustrates a change in usage of the screen in the display device of FIG. 13 according to the invention II, in which (A) shows a navigation display state and (B) shows a list display state.
Figure 18B:
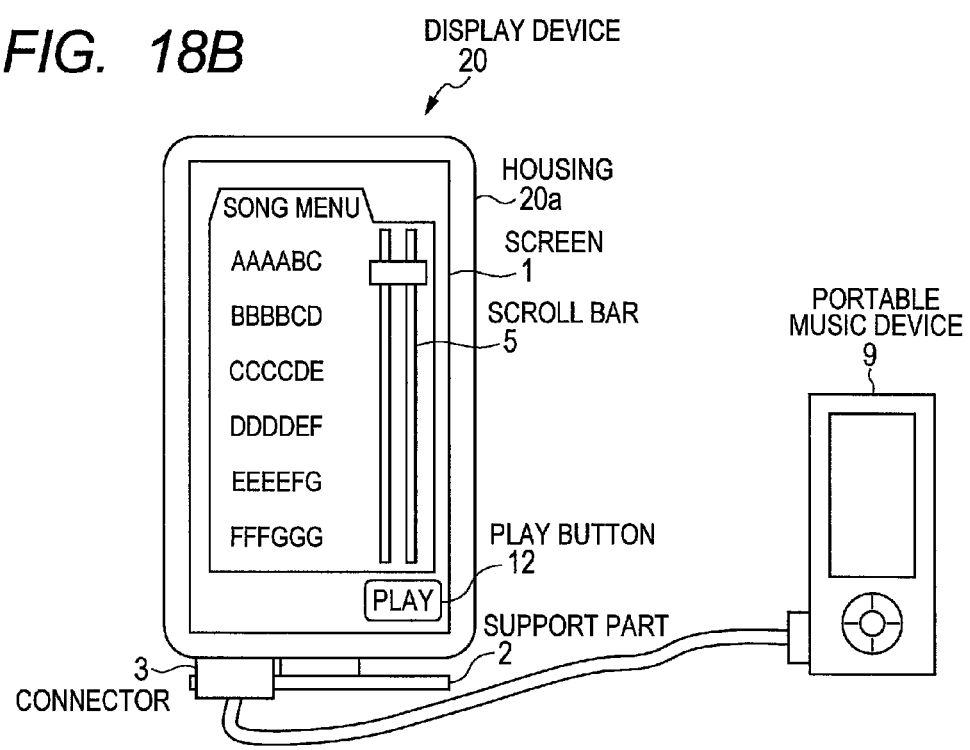

Subsequently, the explanation will be provided with referring to FIG. 18. FIG. 18 shows a manner to change the arrangement state of the screen 1. As shown in FIG. 18, the arrangement state of the screen 1 is changed from the horizontal arrangement (FIG. 18(A)) to the vertical arrangement (FIG. 18(B)). The window state detection unit 26 detects the change in the arrangement state of the screen 1. Thereby, the telephone directory and the calling/called operation history acquired by the information acquisition unit 23 from the portable telephone device 4 are displayed on the screen 1. Such the display manner is referred to as the list display. It is noted that the information of the telephone directory and the calling/called operation history has been stored in the storage unit 24. The driver operates the scroll bar 5 at the window of FIG. 18(B) to select the called party. Having selected the called party, the driver presses down the send button 6. Thereby, the originating process of the portable telephone device 4 is completed. Further, with respect to the change in the arrangement state (the horizontal state to the vertical state, or the vertical state to the horizontal state), since the user can make the operation without focusing on the display, the safety during the traveling can be maintained.

Figure 29:
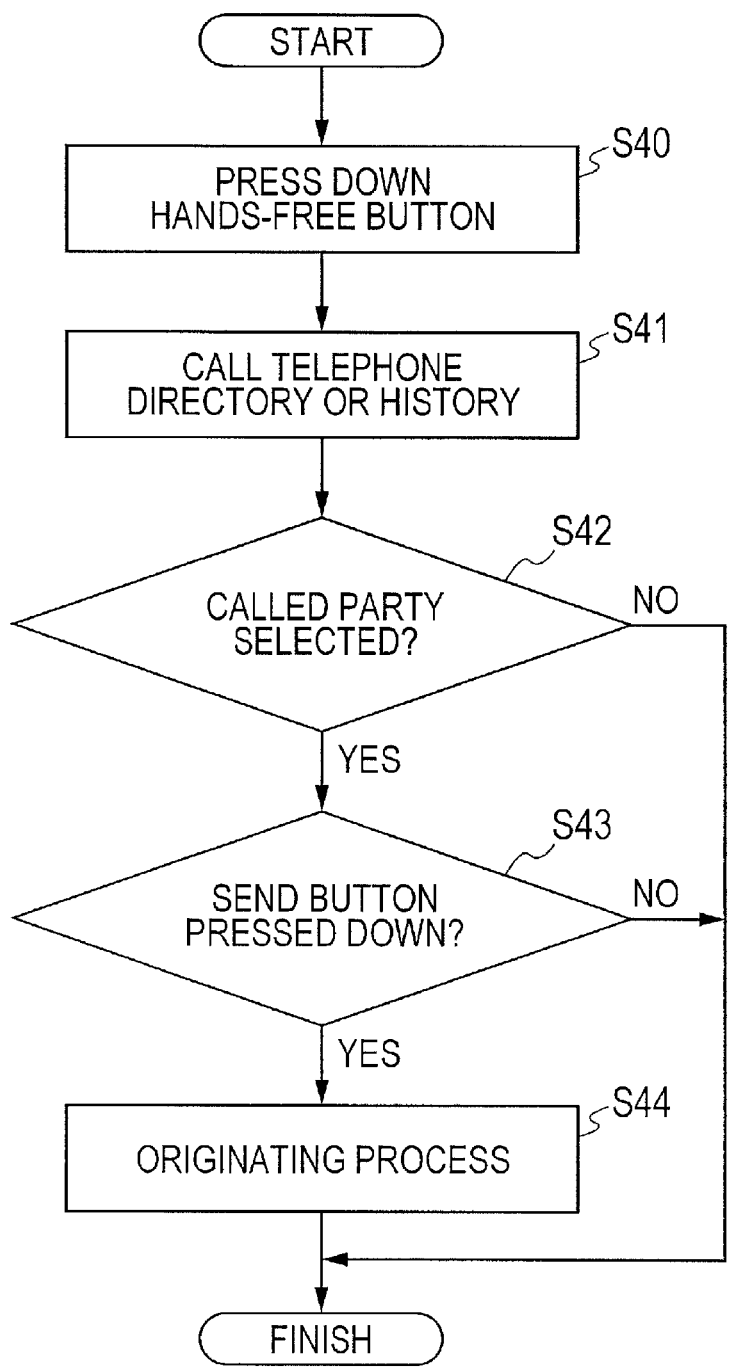
FIG. 29 is a flowchart illustrating the operation procedures used in the conventional hands-free device.

As such, among the procedures explained by referring to FIG. 29, step S40 (pressing down the hands-free-button) and step S41 (calling the telephone directory or the history) can be synchronized with the vertical-horizontal switching of the screen 1. Therefore, steps S40 and S41, which were conventionally necessary, can be substantially omitted.

Figure 19:
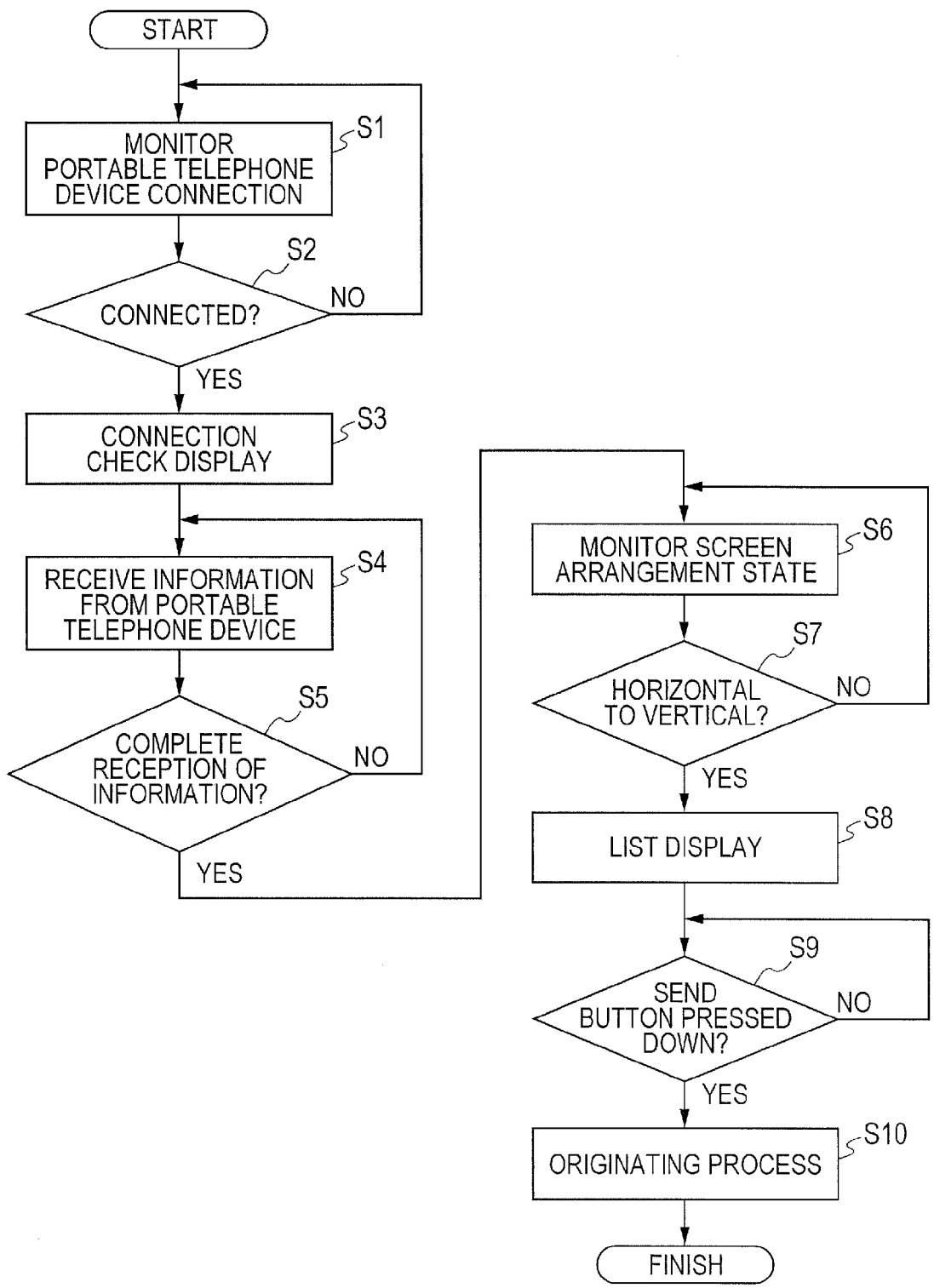
FIG. 19 is a flowchart illustrating a procedure in a control unit according to the first embodiment of the switching operations of display contents in the display device of FIG. 13 according to the invention II.

The above procedures are shown in a flowchart of FIG. 19 as the processing procedure of the control unit 21. The control unit 21 monitors the connection of the portable telephone device 4 by the external equipment detection unit 22 (step S1). Then, the control unit 21 detects the connection of the portable telephone device 4 by the external equipment detection unit 22 (step S2, Yes). At this time, the control unit 21 instructs the display control unit 27 to display the portable telephone device connection check display 10 on the screen 1 (step S3). Further, the control unit 21 receives the information from the portable telephone device 4 through the information acquisition unit 23 (step S4). Upon completion of receiving the information from the portable telephone device 4 through the information acquisition unit 23 (step S5, Yes), the control unit 21 stores this information in the storage unit 24.

The control unit 21 monitors the arrangement state of the screen 1 by the display state detection unit 26 (step S6). The arrangement state of the screen 1 is changed from the horizontal arrangement and the vertical arrangement (step S7, Yes). Subsequently, the control unit 21 controls the display control unit 27 to display on the screen 1 the information stored in the storage unit 24 (step S8). Then, if there is a pressing down of the send button of the operation unit 31 (step S9), the originating process is performed to the portable telephone device 4 (step S10).

It is noted that, if the portable telephone device 4 is not in connection (step S2, No), or if the arrangement state of the screen 1 is not changed even if the portable telephone device 4 is connected (step S7, No), the display device 20 continues to operate as the car navigation device.

(Second Embodiment of the Switching Operation of Display Contents)

Figure 20:
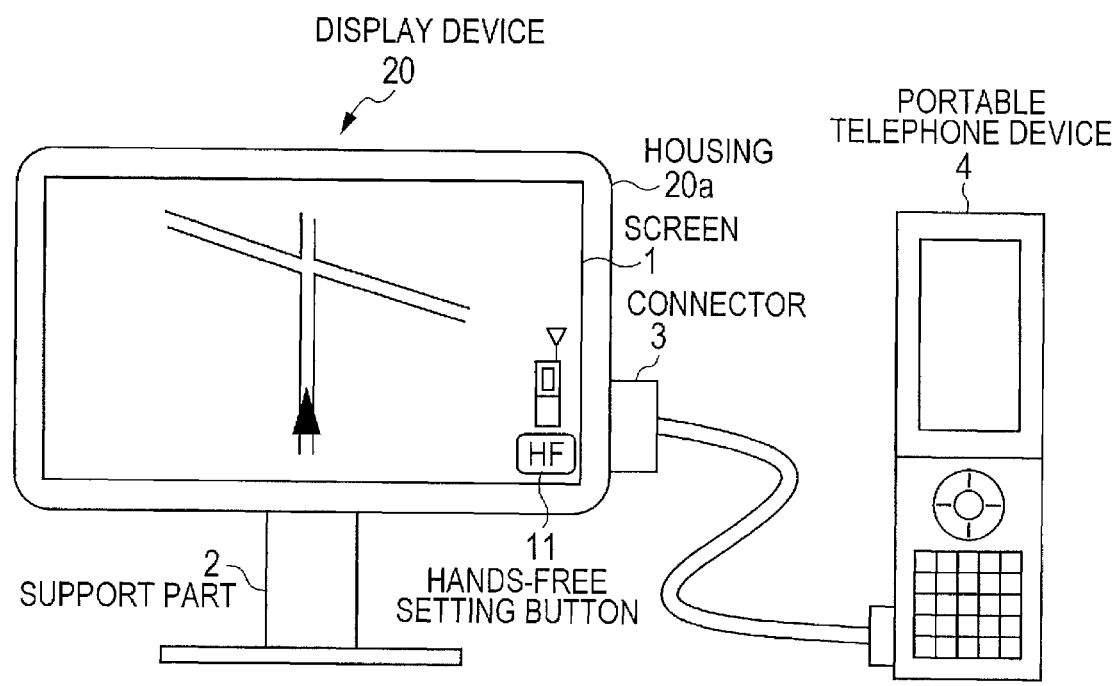
FIG. 20 illustrates a hands-free setting button in the display device of FIG. 13 according to the invention II.

Next, the switching operation of the display contents at the vertical-horizontal switching of the screen 1 will be explained by referring to FIGS. 20-24. FIG. 20 illustrates the hands-free setting button 11. As shown in FIG. 20, in the second embodiment, the hands-free setting button 11 is displayed on the screen 1. The operation unit 31 is a touch panel integrated with screen 1. Therefore, the user presses down the hands-free setting button 11 on the screen 1 and, thereby, the operation unit 31 is operated. The operation of the operation unit 31 is transferred to the control unit 21.

Figure 21A:
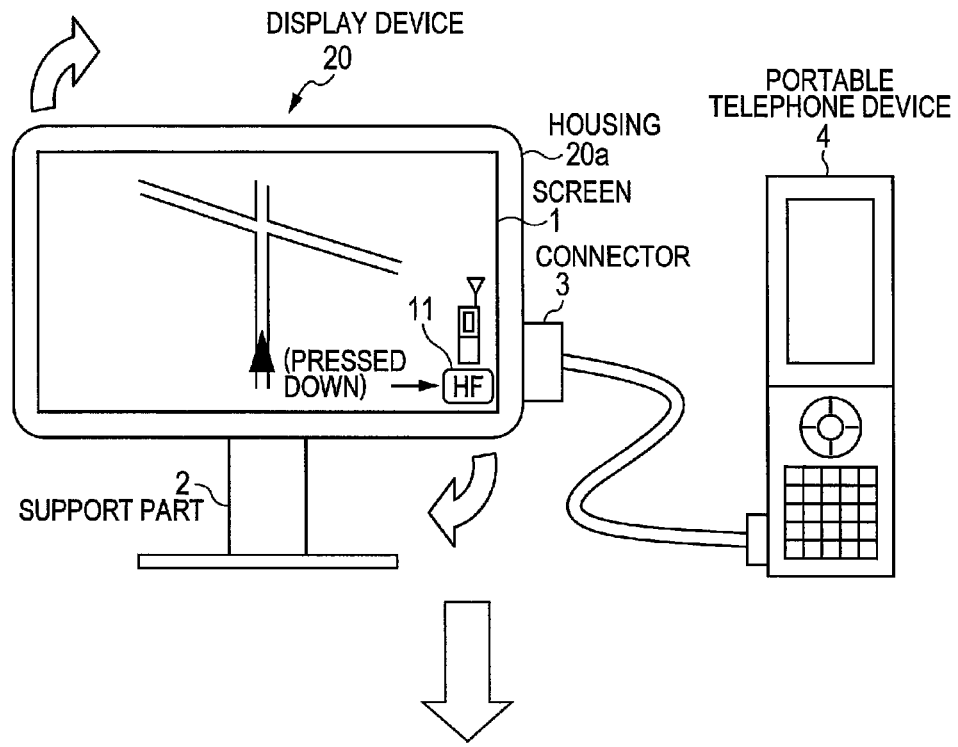
FIG. 21 illustrates the switching of the display contents when the hands-free setting button is pressed down in the display device of FIG. 13 according to the invention II, in which (A) shows a navigation display state and (B) shows a list display state.
Figure 21B:
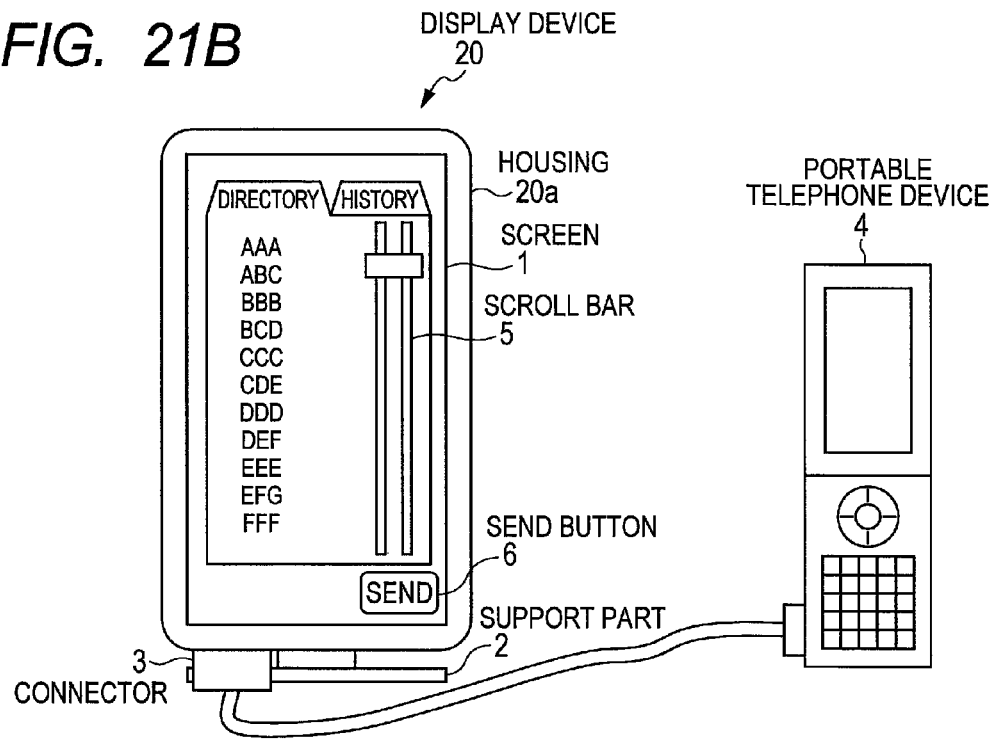

FIG. 21 shows the switching of the display contents when the hands-free setting button 11 is pressed down. If the hands-free setting button 11 is pressed down, the same switching of the display contents as shown in FIG. 6 of the first embodiment is applied.

Figure 22A:
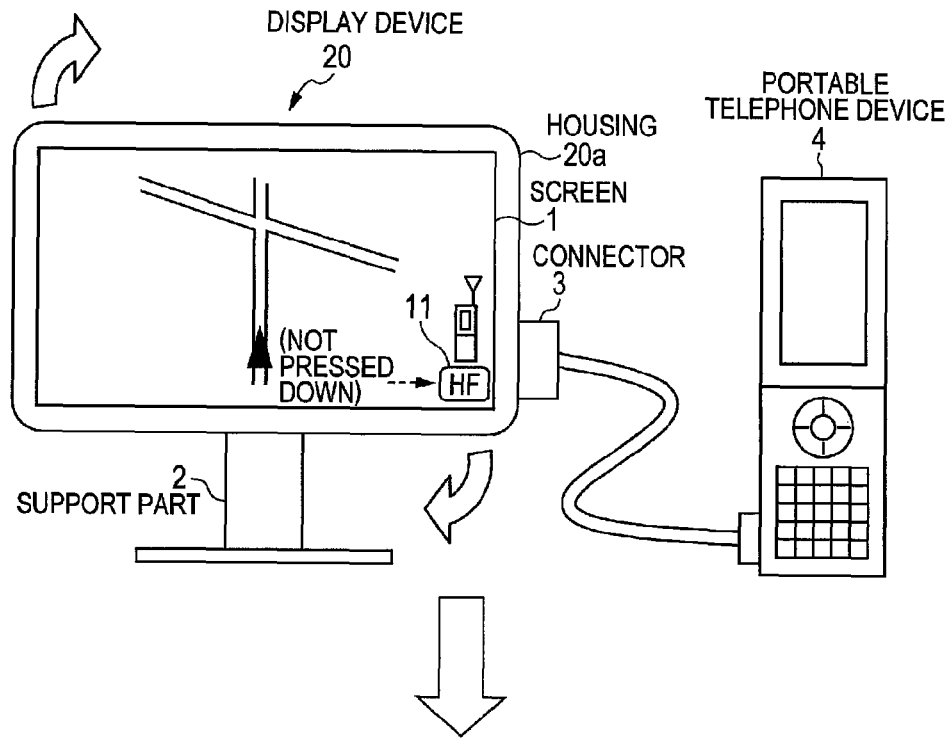
FIG. 22 illustrates the switching of the display contents when the hands-free setting button is not pressed down in the display device of FIG. 13 according to the invention II, in which (A) is a view where the display is in a horizontal arrangement and (B) is a view where the display is in a vertical arrangement.
Figure 22B:
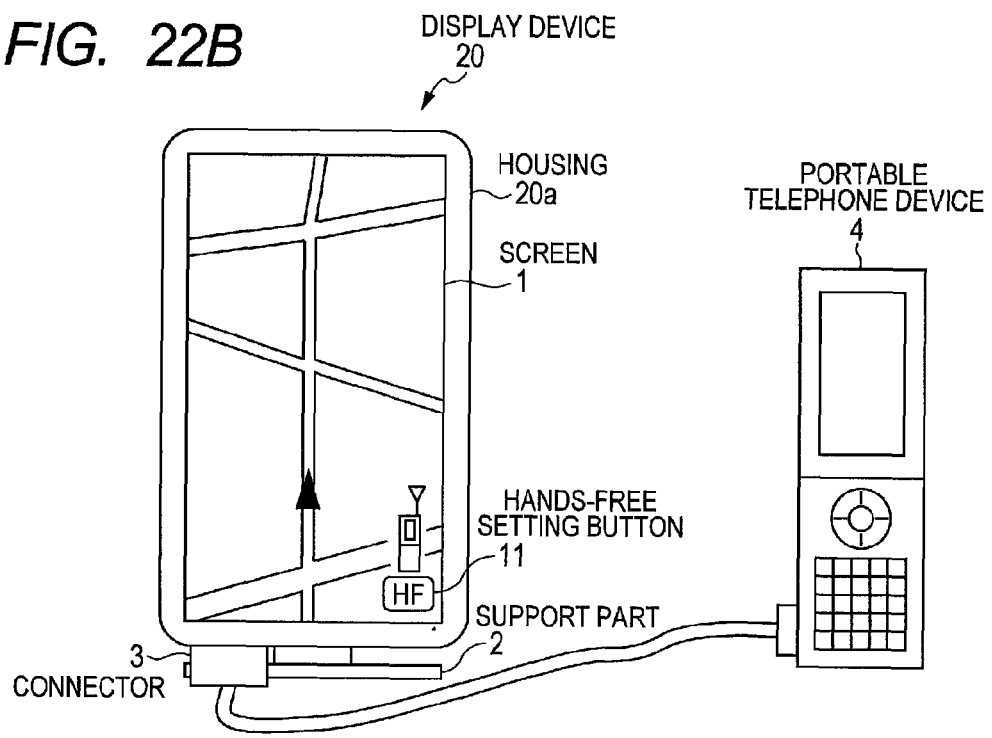

FIG. 22 shows the switching of the display contents when the hands-free setting button 11 is not pressed down. If the hands-free setting button 11 has not been pressed down, the same is applied as the case where the portable telephone device 4 is not connected. Therefore, the display device 20 continues to operate as the car navigation device.

Figure 23A:
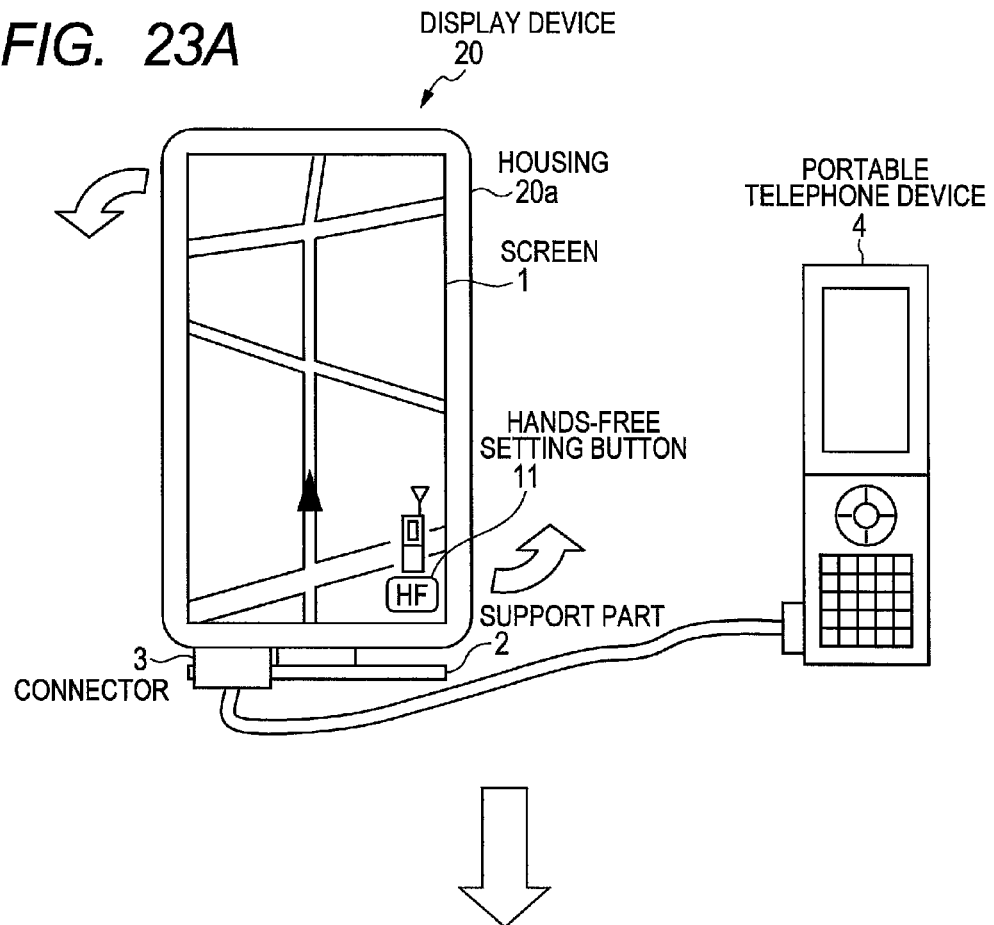
FIG. 23 shows the switching of the display contents when the hands-free setting button is pressed down after the window has been in a vertical arrangement in the display device of FIG. 13 according to the invention II, in which (A) shows a navigation display state and (B) shows a list display state.
Figure 23B:
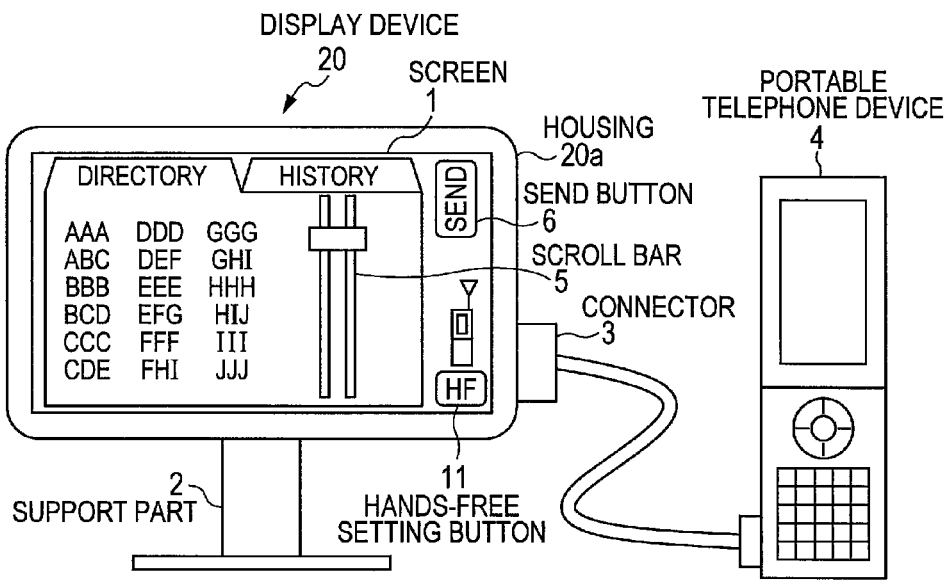

FIG. 23 shows the switching of the display contents when the screen 1 is horizontally arranged after the hands-free setting button 11 was pressed down at the state where the screen 1 was in the vertical arrangement. In the case of FIG. 23, the telephone directory and the calling/called operation history are listed on the horizontally arranged screen 1.

Figure 24:
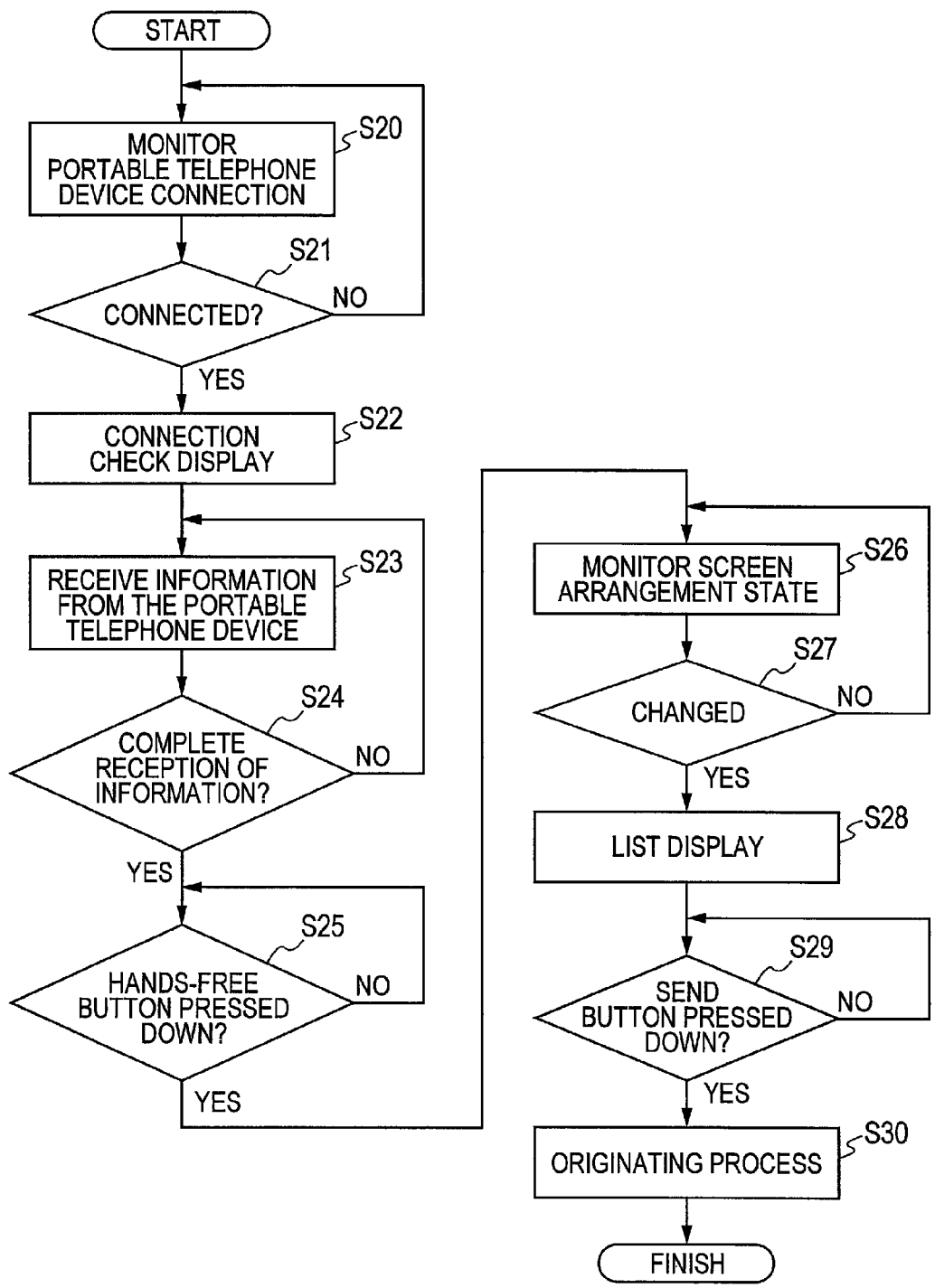
FIG. 24 is a flowchart illustrating a procedure in a control unit according to the second embodiment of the switching operation of the display contents in the display device of FIG. 13 according to the invention II.

The above procedures are shown in a flowchart of FIG. 24 as the processing procedure at the control unit 21. The control unit 21 monitors the connection of the portable telephone device 4 by the external equipment detection unit (step S20). Then, the control unit 21 detects the connection of the portable telephone device 4 by the external equipment detection unit 22 (step S21, Yes). At this time, the control unit 21 instructs the display control unit 27 to display the portable telephone device connection check display 10 on the screen 1 (step S22). Further, the control unit 21 receives the information from the portable telephone device 4 through the information acquisition unit 23 (step S23). Upon completion of receiving the information from the portable telephone device 4 through the information acquisition unit 23 (step S24, Yes), the control unit 21 stores this information in the storage unit 24. In the second embodiment, if the hands-free setting button 11 is not pressed down (step S25, No), the display device 20 continues to operate as the car navigation device.

Here, the hands-free setting button 11 is pressed down (step S25, Yes). In response, the control unit 21 monitors the arrangement state of the screen 1 by the display state detection unit 26 (step S26). Then, the screen 1 is changed in the arrangement from the horizontal to the vertical or from the vertical to the horizontal (step S27, Yes). In response, the control unit 21 controls the display control unit 27 to display on the screen 1 the information stored in the storage unit 24. Thereby, the telephone directory and the calling/called operation history are listed on the screen 1 (step S28). Then, if there is a pressing down of the send button of the operation unit 31 (step S29, Yes), the control unit 21 performs the originating process to the portable telephone device 4 (step S30).

It is noted that, if the portable telephone device 4 is not in connection (step S21, No), or if the portable telephone device 4 is connected and the hands-free setting button 11 is pressed down but the arrangement of the screen 1 is not changed (step S27, No), the display device 20 continues to operate as the car navigation device.

(Third Embodiment of the Switching Operation of Display Contents)

Next, as a third embodiment, the switching operation of the display contents at the vertical-horizontal switching of the screen 1 will be explained by referring to FIGS. 25 and 26. FIG. 25 shows the process until a keyboard 7 is displayed on the screen 1. In the third embodiment, as shown in FIG. 25, the keyboard 7 is displayed when the screen is in the horizontal arrangement.

Figure 25A:
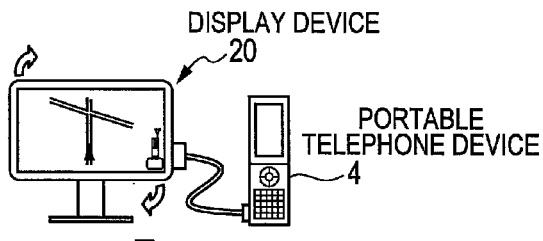
FIG. 25 shows a process before a keyboard is displayed on the screen in the display device of FIG. 13 according to the invention II, in which (A) shows a navigation display state, (B) shows a list display state, and (C) shows a keyboard display state.
Figure 25B:
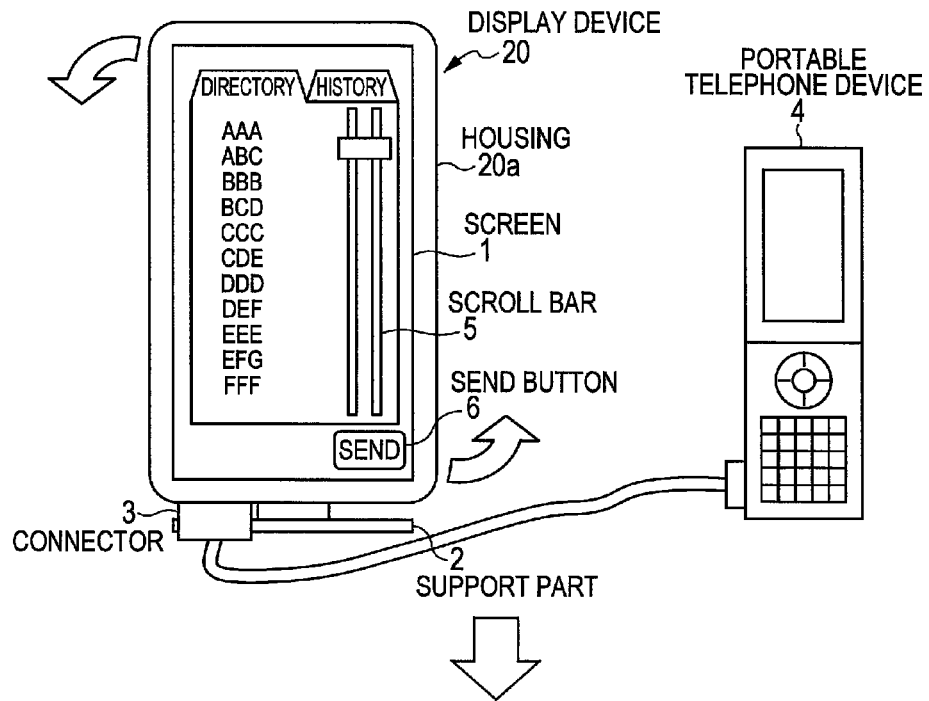
Figure 25C:
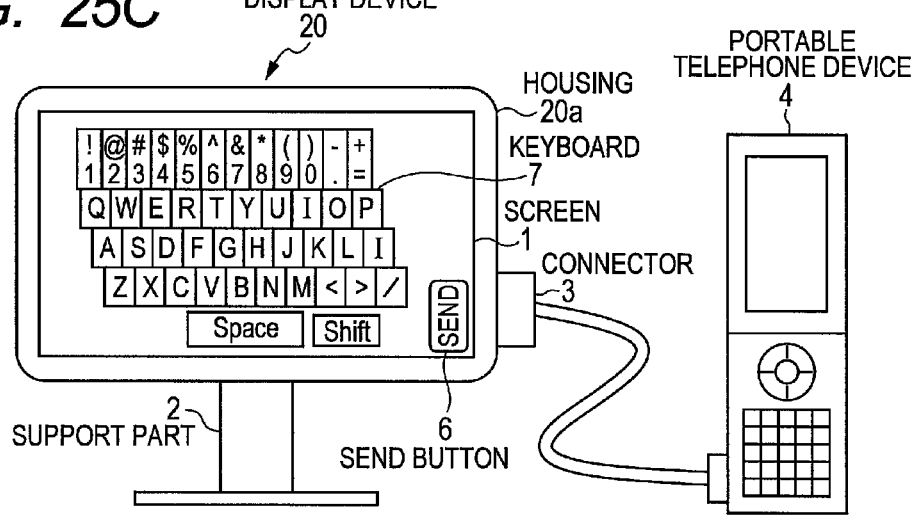

FIG. 25(A) shows the display device 20 when the car navigation device is being used. FIG. 25(B) shows the state where the screen 1 has been changed from the car navigation display to the list display. Here, it is assumed that the send button 6 has not been pressed down. In addition, it is assumed that the screen 1 is changed from the vertical arrangement to the horizontal arrangement. At this time, the keyboard 7 is displayed on the horizontally arranged screen 1 as shown in FIG. 25(C) in the third embodiment. This keyboard 7 is useful when the SMS (Short Message Service) is used.

Figure 26:
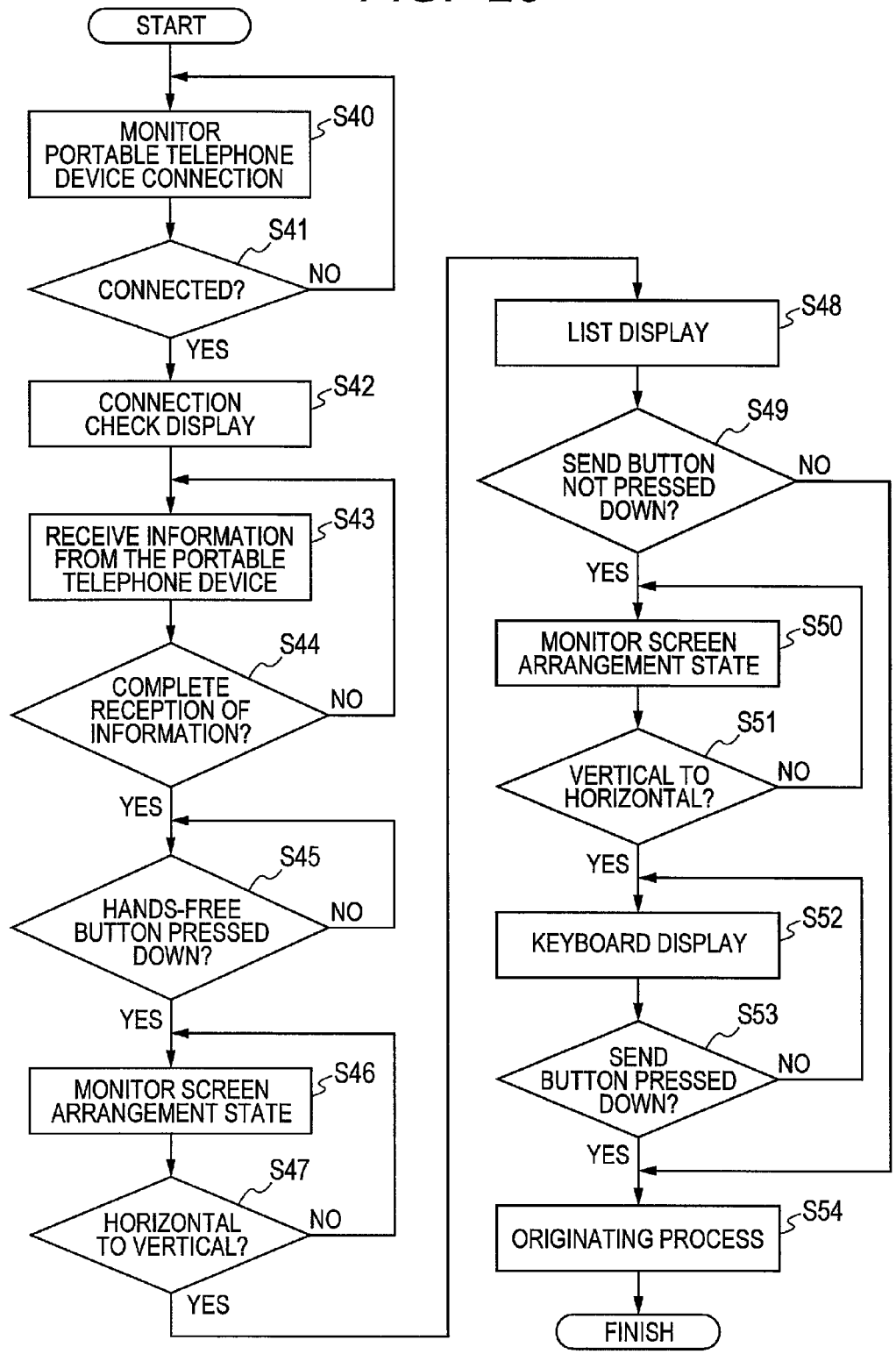
FIG. 26 is a flowchart illustrating a procedure in a control unit according to the third embodiment of the switching operation of the display contents in the display device of FIG. 13 according to the invention II.

The above procedures are shown in a flowchart of FIG. 26 as the processing procedure of the control unit 21. The control unit 21 monitors the connection of the portable telephone device 4 by the external equipment detection unit 22 (step S40). Then, the control unit 21 detects the connection of the portable telephone device 4 by the external equipment detection unit 22 (step S41, Yes). At this time, the control unit 21 instructs the display control unit 27 to display the portable telephone device connection check display 10 on the screen 1 (step S42). Further, in response, the control unit 21 receives the information from the portable telephone device 4 through the information acquisition unit 23 (step S43). Upon completion of receiving the information from the portable telephone device 4 through the information acquisition unit 23 (step S44, Yes), the control unit 21 stores this information in the storage unit 24. Then, if the hands-free setting button 11 is not pressed down (step S45, No), the display device 20 continues to operate as the car navigation device. It is noted that the hands-free setting button 11 may not be provided in the third embodiment.

Here, the hands-free setting button 11 is pressed down (step S45, Yes). In response, the control unit 21 monitors the arrangement state of the screen 1 by the display state detection unit 26 (step S46). If the screen 1 is changed in the arrangement from the horizontal to the vertical or from the vertical to the horizontal (step S47, Yes), the control unit 21 then controls the display control unit 27 to display on the screen 1 the information stored in the storage unit 24. Thereby, the telephone directory and the calling/called operation history are listed on the screen 1 (step S48). Then, if there is a pressing down of the send button 6 of the operation unit 31 (step S49, Yes), the originating process is performed to the portable telephone device 4 (step S54).

Here, it is assumed that there is no pressing down of the send button 6 of the operation unit 31 (step S49, Yes). The control unit 21 monitors the arrangement state of the screen 1 by the display state detection unit 26 (step S50). Then, if the screen 1 is changed in the arrangement from the vertical to the horizontal (step S51, Yes), the control unit 21 then displays the keyboard 7 on the screen 1 (step S52). Here, after the predetermined input operation, if there is a pressing down of the send button 6 of the operation unit 31 (step S53, Yes), the originating process is performed to the portable telephone device 4 (step S54).

(Supplemental Explanations of Each Embodiment)

The flowcharts of FIGS. 19, 24, and 26 end at the originating process. However, there is a case where the process is discontinued without performing the origination. In this case, a reset button (not shown) is pressed down. The procedure to return to the navigation display may be thereby added.

Figure 27:
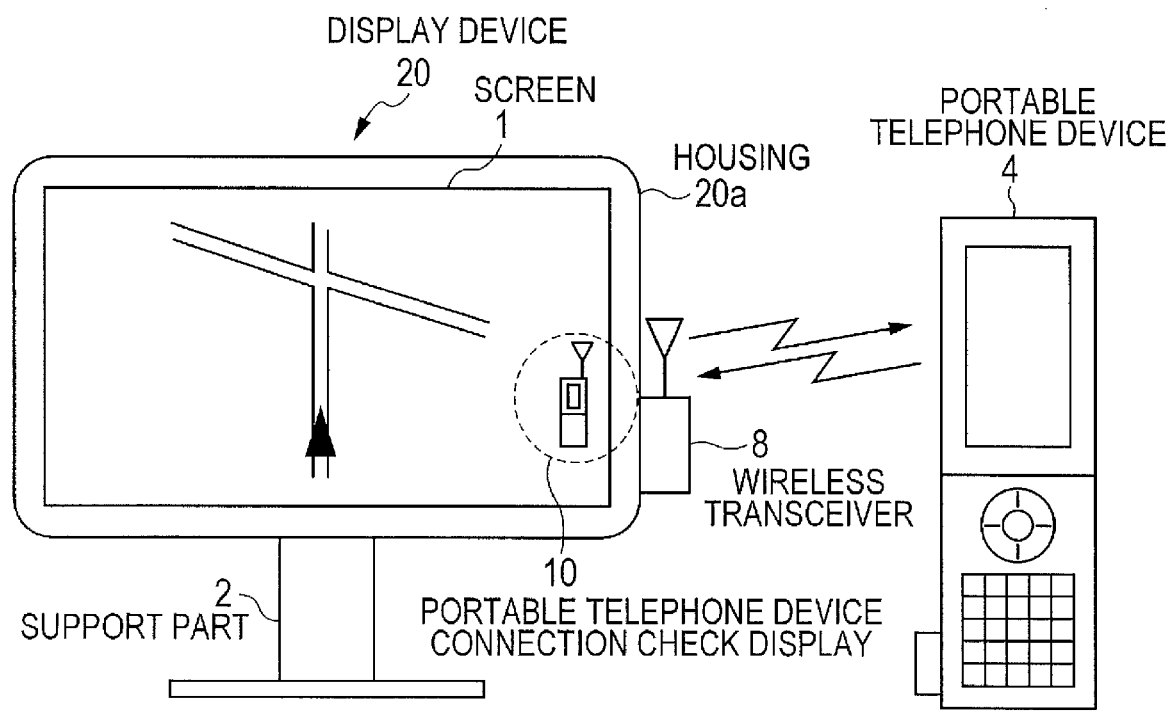
FIG. 27 illustrates an embodiment in which a wireless transceiver is used for the communication between the display device of FIG. 13 according to the invention II and a portable telephone device.

FIG. 27 shows the embodiment using a wireless transceiver 8. As shown in FIG. 27, the connection between the portable telephone device 4 and the display device 20 maybe established through the wireless communication line by using the wireless transceiver 8. For example, the Bluetooth (trademark) may be used for the wireless communication line. By using such a wireless communication, the change to the screen can be made without needing the consideration of the cable.

Figure 28A:
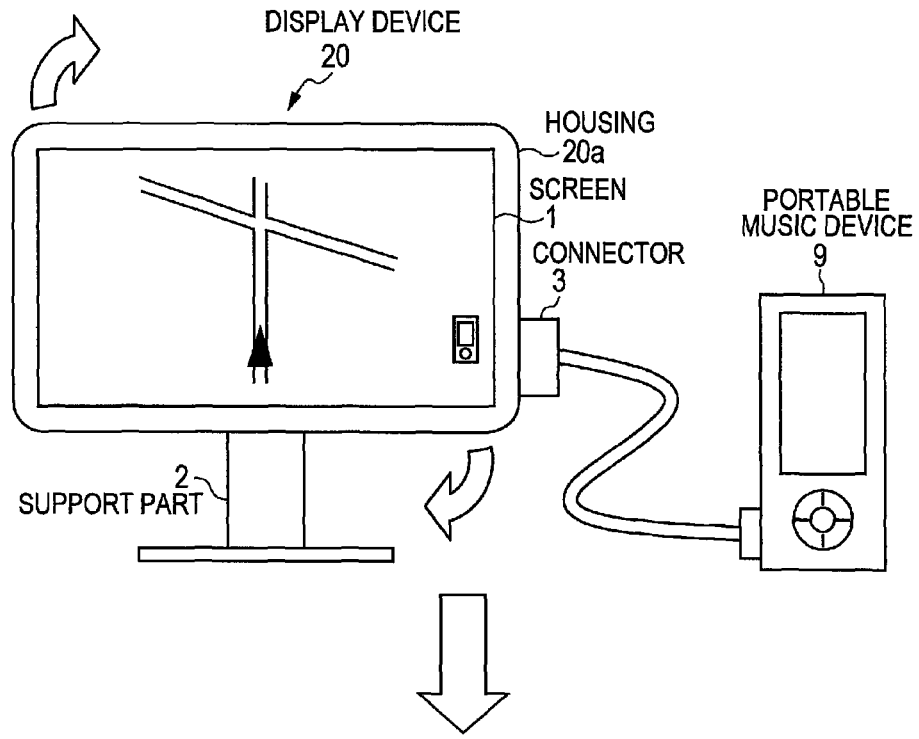
FIG. 28 illustrates an embodiment in which the display device of FIG. 13 according to the invention II and a portable telephone device are connected, in which (A) is a view where the screen is in a horizontal arrangement and (B) is a view where the screen is in a vertical arrangement.

FIG. 28 shows the embodiment in which a portable music device 9 and the display device 20 are connected. In the example of FIG. 28, the portable music device 9 instead of the portable telephone device 4 is connected to the display device 20. When the portable music device 9 is connected to the display device 20, the information acquisition unit 23 acquires the information of the song menu from the portable music device 9. This information is stored in the storage unit 24.

Figure 28B:
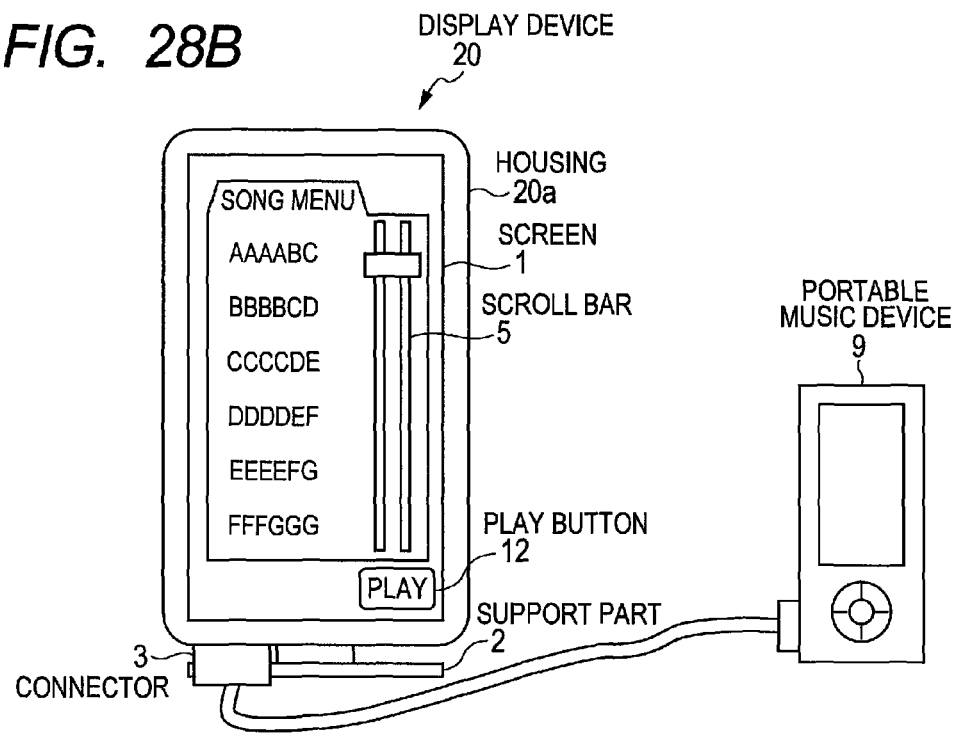

As shown in FIG. 28(B), it is the song menu that is displayed when there is a change from the horizontal arrangement to the vertical arrangement. After the selection from the song menu, the reproduction is started by pressing down a play button 12. The reproduction of the music is outputted from an audio output unit 30.

(Embodiment of the Program)

The embodiment of a program will be explained, in which the program, when installed in an information processing device, instructs the information processing device to implement the function of each unit in the display device 20 of the present embodiment. Here, the information processing device refers to a general purpose computer device. The general purpose computer device may be a CPU (Central Processing Unit), for example.

The program of the present embodiment is recorded to a storage medium, so that the information processing device can use this storage medium for installation of the program of this embodiment. Alternatively, the program of this embodiment can be directly installed in the information processing device via the network from the server that stores the program of the present embodiment.

Thereby, the information processing device can be used to achieve the respective functions of the control unit 21, the external equipment detection unit 22, the information acquisition unit 23, the storage unit 24, the display state detection unit 26, the display control unit 27, and the route search unit 28. It is noted that, with respect to other functions than the above, the function that can be embodied by software may be implemented by the program of the present embodiment.

It is noted that the program of the present embodiment includes not only the program that can be directly executed by the information processing device but also the program that can be executed after the installation in the hard disc. Further, the program includes the compressed and/or the encrypted one.

The embodiments of the present invention have been described above. However, modifications thereto can be made in various ways as long as the concept of the present invention is not changed. For example, while, in the display device 20 of the above embodiments, the housing 20a is a rectangular and the screen 1 is also a rectangular, it is possible that the housing 20a is a rectangular but the screen 1 is a square. In this case, while the screen 1 becomes a square in both cases of being vertically arranged and horizontally arranged, it is determined depending on the state of the housing whether it is vertical or horizontal.

It has been explained that the list display is not provided if the screen 1 is changed from the horizontally arranged state to the vertically arranged state without pressing down the hands-free button 11. However, the list display may be provided if the hands-free button 11 is pressed down after the screen 1 was changed from the horizontally arranged state to the vertically arranged state without pressing down the hands-free button 11.

As the list display, it may be the telephone directory and the calling/called operation history; two of the calling operation history and the called operation history; or three of the above two and the telephone directory. Further, instead of providing the list display, it is possible to display one of the items and sequentially switch the displayed items by scrolling the display, or display the latest calling telephone number and the latest called telephone number only.

Further, it is possible to change the displayed contents according to the rotation direction, for example, to display the list of the telephone directories when the screen is rotated to the right from the horizontally arranged state, and display the list of the calling/called operation history when the screen is rotated to the left from the horizontally arranged state. That is, two, three, or four arrangements for the screen may be defined and the display contents may be different or the same according to respective arrangements.

The invention claimed is:

1. A guide display device comprising:
   a current position acquisition unit configured to acquire a current position;
   a destination storage unit configured to store a destination;
   a display unit configured to display an image;
   a display control unit configured to control a display content; and
   an arrangement change detection unit configured to detect that an arrangement of a screen of the display unit has been changed,
   wherein the display control unit causes the display unit to display detailed information of the destination or its surrounding area if the arrangement of the screen is changed under a state where a distance between the current position and the destination is less than a predetermined distance.

2. The guide display device according to claim 1, wherein the display unit displays map information.

3. The guide display device according to claim 1, wherein the display control unit causes the display unit to display information of a facility of the destination or its peripheral facility as the detailed information.

4. The guide display device according to claim 3, wherein, if the destination is a facility of transportation facilities or if there is a facility of transportation facilities around the destination, the display control unit causes the display unit to display information of an access route to the facility as the detailed information.

5. The guide display device according to claim 1 further comprising a unit configured to determine what transportation is used.

6. The guide display device according to claim 5, wherein, if the transportation is a vehicle, the display control unit causes the display unit to display information of a parking lot and, otherwise, to display information of a facility of the destination or its peripheral facility.

7. The guide display device according to any one of claims 1 to 5, the detailed information of the destination or its surrounding area is information stored in the storage unit together with the map information and/or information downloaded by using a communication unit.

8. A guide display method for displaying guide information on a screen, the method comprising the step of:
   displaying detailed information of a destination or its surrounding area on the screen if a change in an arrangement of the screen is detected, if the destination has been set in advance, and if a distance between a current position and the destination is less than a predetermined distance.

9. A display device in which an arrangement state of the screen can be selected between a first state and a second state, the display device comprising:
- an external equipment detection unit configured to detect a connection of external equipment;
- an information acquisition unit configured to acquire information from the external equipment if the external equipment detection unit detects the connection of the external equipment;
- a screen state detection unit configured to detect whether the arrangement state of the screen is in the first state or the second state; and
- a display control unit configured to display at least a portion of the information acquired by the information acquisition unit if the change in the arrangement state of the screen is detected by the screen state detection unit after the external equipment detection unit detected the connection of the external equipment.

10. The display device according to claim 9,
- wherein the external equipment is a portable telephone device, and
- wherein the display control unit displays predetermined image information on the screen if a calling operation of the portable telephone device has not been made and the change in the arrangement state of the screen is again detected by the screen state detection unit after at least a portion of the information acquired by the information acquisition unit was displayed on the screen.

11. The display device according to claim 2, wherein the predetermined image information is image information of a keyboard.

12. The display device according to any one of claims 9 to 11, wherein the display control unit prohibits the display of the information acquired by the information acquisition unit if there is no predetermined operation input even if the change in the arrangement state of the screen is detected by the screen state detection unit after the external equipment detection unit detected the connection of the external equipment.

13. A method for switching a display content for use in a display device in which an arrangement state of the screen can be selected between a first state and a second state, the method comprising the steps of:
- detecting a connection of external equipment;
- acquiring information from the external equipment if the connection of the external equipment is detected;
- detecting whether the arrangement state of the screen is in the first state or the second state; and
- displaying at least a portion of the information acquired by the step of acquiring, if the change in the arrangement state of the screen is detected after the connection of the external equipment was detected.

14. The method according to claim 13, wherein the display of the information acquired by the step of acquiring is prohibited if there is no predetermined operation input even if the change in the arrangement state of the screen is detected after the connection of the external equipment was detected.

15. A program, when installed in an information processing device, instructing the information processing device to perform a function as a display device in which an arrangement state of a screen can be selected between a first state and a second state, the program configured to implement:
- an external equipment detection function for detecting a connection of external equipment;
- an information acquisition function for acquiring information from the external equipment if the external equipment detection function detects the connection of the external equipment;
- a screen state detection function for detecting whether the arrangement state of the screen is in the first state or the second state; and
- a display control function for displaying at least a portion of the information acquired by the information acquisition function if the change in the arrangement state of the screen is detected by the screen state detection function after the external equipment detection function detected the connection of the external equipment.

* * * * *